US012489774B2

(12) United States Patent
Thomas et al.

(10) Patent No.: US 12,489,774 B2
(45) Date of Patent: Dec. 2, 2025

(54) TRACKING, EVALUATING, AND IMPROVING RESPONSES TO MALICIOUS THREATS IN A NETWORK SECURITY SYSTEM

(71) Applicant: Target Brands, Inc., Minneapolis, MN (US)

(72) Inventors: Derek Edward Thomas, Minneapolis, MN (US); Kelsey Helms, Tacoma, WA (US)

(73) Assignee: Target Brands, Inc., Minneapolis, MN (US)

( * ) Notice: Subject to any disclaimer, the term of this patent is extended or adjusted under 35 U.S.C. 154(b) by 260 days.

(21) Appl. No.: 18/496,064

(22) Filed: Oct. 27, 2023

(65) Prior Publication Data

US 2025/0141896 A1  May 1, 2025

(51) Int. Cl.
H04L 9/40 (2022.01)
(52) U.S. Cl.
CPC ...... H04L 63/1425 (2013.01); H04L 63/1416 (2013.01); H04L 63/20 (2013.01)
(58) Field of Classification Search
None
See application file for complete search history.

(56) References Cited

U.S. PATENT DOCUMENTS

| 9,407,645 | B2 | 8/2016 | Modi et al. | |
|---|---|---|---|---|
| 9,705,921 | B2 * | 7/2017 | Voit | H04L 63/20 |
| 10,277,618 | B1 * | 4/2019 | Wu | H04L 63/105 |
| 11,258,806 | B1 | 2/2022 | Berninger et al. | |
| 11,444,960 | B2 | 9/2022 | Drapeau et al. | |
| 12,212,592 | B2 * | 1/2025 | Gupta | H04L 63/1433 |
| 12,316,676 | B2 * | 5/2025 | Levari | H04L 63/20 |
| 12,393,683 | B2 * | 8/2025 | Kim | G06F 21/577 |
| 2016/0294871 | A1 * | 10/2016 | Huston, III | H04L 63/1458 |
| 2022/0103581 | A1 | 3/2022 | Bernholz et al. | |
| 2023/0114821 | A1 | 4/2023 | Thomas et al. | |

(Continued)

OTHER PUBLICATIONS

"ATT&CK Matrix for Enterprise", accessed at https://attack.mitre.org on Jul. 13, 2023, 1 page.

(Continued)

Primary Examiner — Younes Naji
(74) Attorney, Agent, or Firm — Barnes & Thornburg LLP

(57) ABSTRACT

Disclosed are systems and methods for identifying threat events in an enterprise network and managing detection rules and responses to the events. A threat intelligence computer system can receive information about a detected threat event including a phase of attack and a detected domain of the threat event, apply at least one tag to the detected event that associates the event with at least one of the rules triggered in response to detecting the event, evaluate the tagged rules against the information, flag the event as having an improvement opportunity, determine whether the rule tagged to the event is a candidate for improvement, generate, based on the determination, instructions for improving the rule, generate a prioritization scheme indicating an order to address the instructions to improve the rule amongst instructions to improve various threat detection rules, and generate and return output indicating the prioritization scheme for presentation at user devices.

20 Claims, 20 Drawing Sheets

(56) References Cited

U.S. PATENT DOCUMENTS

2023/0139000 A1    5/2023    Apger et al.

OTHER PUBLICATIONS

"How to Leverage the MITRE ATT&CK Framework for Threat Intelligence", accessed at https://www.picussecurity.com/how-to-leverage-the-mitre-attack-framework-for-threat-intelligence on Jul. 13, 2023, 13 pages.

MITRE ATT&CK—Campaigns, accessed at https://attack.mitre.org/campaigns/ on Jul. 13, 2023, 1 page.

"MITRE ATT&CK—Groups", accessed at https://attack.mitre.org/groups/, 1 page.

"Threat Intelligence | Product Overview—Group-IB", accessed at group-ib.com on Jul. 13, 2023, 5 pages.

"Threat Intelligence Exchange (CTIX) | Cyware", accessed at https://cyware.com/products/threat-intelligence-exchange on Jul. 13, 2023, 19 pages.

"Threat Intelligence Platform | Cybersecurity Products & Services—Group-IB", accessed at https://www.group-ib.com/products/threat-intelligence/ on Jul. 13, 2023, 10 pages.

"Use a Threat Map, Visualize YourCyber Threats", accessed at https://www.recordedfuture.com/use-a-threat-map-to-visualize-your-cyber-threats on Jul. 13, 2023, 8 pages.

Piazza, Andy, "Quantifying Threat Actors with Threat Box", Medium (Sep. 17, 2020), accessed at https://klrgrz.medium.com/quantifying-threat-actors-with-threat-box-e6b641109b11 on Oct. 26, 2023, 18 pages.

\* cited by examiner

TRACKING, EVALUATING, AND IMPROVING RESPONSES TO MALICIOUS THREATS IN A NETWORK SECURITY SYSTEM

TECHNICAL FIELD

This disclosure generally describes devices, systems, and methods related to identifying, evaluating, and improving responses in a network security system to malicious network threat entities, such as threat actors and malware instances.

BACKGROUND

Enterprises, such as corporations, can implement network security systems to protect against network security threats, internet security threats, hackers, and other malicious parties that intend to compromise the enterprise's network infrastructure (e.g., internal network, enterprise network). A security system deployed by the enterprise can detect malicious events before threat entities can fully infiltrate the enterprise's system(s), thereby protecting the enterprise from the malicious intent of the threat entities.

Detection rules can be developed and deployed in the security systems of the enterprise to act as gatekeepers. For example, some detection rules can be configured to analyze network data and traffic. These rules can continuously monitor the network data and traffic to look for potential threat actions and/or threat entities. These rules can also monitor or scan the network data and traffic at different time intervals or at predetermined times. When potential threats are identified, one or more detection rules may be triggered to respond. Some detection rules can respond by sending alerts to the enterprise or other parties or relevant stakeholders. The alerts can notify such parties of a potential or actual network security threat. The alerts can also include an indication of how serious the network security threat may be. The alerts can provide instructions or recommendations on how the parties should respond to the identified threat. Sometimes, the detection rules can response by automatically preventing the threat from infiltrating the enterprise's system(s) or otherwise infecting the enterprise.

Security threats can and do change over time, and some existing detection rules may not pick up on or identify these security threats. Sometimes, the existing detection rules may not be tested overtime to measure their effectiveness in detecting existing, changing, and/or new security threats. Sometimes, the enterprise's network security system may have an absence of detection rules for new and/or ever-changing security threats and/or threat entities. Sometimes, the enterprise may simulate attack techniques in order to test capabilities of the enterprise's security system to detect and respond to the threats. Significant amounts of effort may be needed to build out all possible attack scenarios for this type of testing, and may not take into consideration different versioning, tactics, techniques, procedures, and/or other information associated with the security threats and the threat entities.

SUMMARY

The disclosure generally describes technology related to a threat intelligence platform (e.g., system, framework) for identifying, flagging, associating tactics, techniques, and/or procedures of threat entities (e.g., threat actors, malware instances, threat actions) and evaluating the platform's responses thereto, such as threat detection rules (e.g., YARA rules). The disclosed technology can automatically assess sufficiency and performance of network security systems, associated detection rules, and threat entity intelligence upon which detection and responses are based-permitting for intelligence, detection, and response gaps to be more quickly and accurately identified and remedied within an ever-changing ecosystem of network security threats and/or actors/entities. For example, the volume of network security threats that are presented to network security systems can be immense and can continually change, which can pose significant challenges to network security systems seeking to stay up-to-date with intelligence, detection rules, and responses to isolate such threats. The disclosed technology can provide a platform that is configured to automatically assess the sufficiency of and gaps in current threat entity intelligence, detection rules, and responses within an enterprise's network security system (or a network security system more generally), including identifying gaps in intelligence related to threat attack and detection domains for threat entities, detection rule performance, and the freshness of threat entity intelligence. Such sufficiency and gap assessment can prompt and improve the intelligence, rules, and detection techniques of the enterprise to better address security threats and threat entities as they change over time, thereby improving overall system intelligence.

For example, the threat intelligence platform can be directed to organizing cyber security threat information and appropriately responding to such threats. The disclosed technology may provide a collaboration tool configured to automatically aggregate and associate a variety of disparate information, including third party-generated cyber security threat information, threat detection information from an internal network, threat response information, and analysis information regarding connections of new threats to existing responses and/or malware detection rules. Accordingly, the disclosed technology may be used to identify and readily respond to various types of vulnerabilities, fraud, reverse engineering, and red teaming acts (e.g., symmetrically and rigorously identifying an attack path that breaches an enterprise's security defense through real-world attack techniques). The connection of disparate cyber security threat, detection, and response information can facilitate better and more proactive maintenance of an enterprise's cyber security infrastructure, performed by relevant users, automated computer systems, and/or artificial intelligence (AI) techniques. The disclosed technology may provide for relevant users, such as security analysts, to add security event information and tags to the connected information, thereby providing strategic views of particular threat entities and/or types of malware and how they are being addressed by detection rules of the enterprise's threat intelligence system. Moreover, the disclosed technology may be used to identify and prioritize potential gaps in the system's threat detection and response capabilities. The disclosed platform may provide graphical user interface (GUI) displays and other visuals, such as graphical comparisons and/or ranking tools, to plot the detected and identified capabilities of various threat entities against their intent, which can be used by automated computing systems and/or relevant users for prioritizing and addressing security activities and response strategies and/or improvements.

One or more embodiments described herein can include a system for identifying threat events in an enterprise network and managing detection rules and responses to the threat events, the system including: a data store that can be configured to store information about threat events known to the enterprise network and threat detection rules, an enterprise network having a group of computing devices communicating with each other and with other computing devices external to the enterprise network using at least one of wired or wireless communications, and a threat intelligence computer system that can be configured to monitor detected threat events and manage the threat detection rules and responses to the detected threat events. The computer system can be configured to perform operations that may include: receiving information about a detected threat event, the information including at least a phase of attack of the threat event and a detection domain of the threat event, applying, based on processing the information, at least one tag to the detected threat event, the at least one tag associating the detected threat event with at least one of the threat detection rules that was triggered in response to detecting the threat event in the enterprise network, evaluating the tagged threat detection rules against the information about the detected threat event, flagging the detected threat event as having an improvement opportunity based on the evaluation satisfying one or more improvement opportunity criteria, determining, for the detected threat event, whether the at least one threat detection rule tagged to the detected threat event is a candidate for improvement, generating, based on a determination that the at least one threat detection rule is the candidate for improvement, instructions for improving the at least one threat detection rule, generating a prioritization scheme indicating an order by which to address the instructions to improve the at least one threat detection rule amongst a group of instructions to improve one or more threat detection rules, generating output including the prioritization scheme, and transmitting the output to one or more user devices of relevant users of the enterprise. Transmitting the output to the user devices can include transmitting instructions that, when executed by the user devices, may cause the user devices to present the output in respective graphical user interface (GUI) displays.

In some implementations, the embodiments described herein can optionally include one or more of the following features. For example, the operations can also include receiving, from at least one of the user devices and based on the presented output, user input indicating one or more adjustments to the at least one threat detection rule, adjusting the at least one threat detection rule based on the user input, and transmitting the adjusted threat detection rule to a network security system, the network security system being configured to execute the adjusted threat detection rule in response to detecting threat events in the enterprise network. The operations may include receiving, from at least one of the user devices, user input indicating additional information about the at least one threat detection rule or the at least one identified threat event, and updating, based on the additional information, one or more data entries in the data store that may be associated with the at least one identified threat event.

In some implementations, the phase of attack can include at least one of an intrusion phase, a host activity phase, a propagation phase, and an end goal phase, the threat intelligence computer system being configured to automatically detect the phase of attack of the threat event. Sometimes, generating a prioritization scheme may include: determining, for the instructions to improve the at least one threat detection rule associated with the detected threat event, a prioritization level, where determining the prioritization level can be based on identifying a prevalence of one or more tactics, techniques, and procedures indicated in the information about the detected threat event, and ranking, in the prioritization scheme, the instructions to improve the at least one threat detection rule associated with the detected threat event amongst the group of instructions from highest prevalence to lowest prevalence based on the determined prioritization level. Sometimes, identifying the prevalence of one or more tactics, techniques, and procedures indicated in the information about the detected threat event may include: determining a high prevalence based on the one or more tactics, techniques, and procedures being identified in at least two-thirds of the threat events known to the enterprise network, determining a medium prevalence based on the one or more tactics, techniques, and procedures being identified in approximately half but less than two-thirds of the threat events known to the enterprise network, and determining a low prevalence based on the one or more tactics, techniques, and procedures being identified in less than half of the threat events known to the enterprise network.

In some implementations, determining, for the detected threat event, whether the at least one threat detection rule tagged to the detected threat event is a candidate for improvement may include: determining whether at least a threshold period of time passed since a first-recorded date associated with the detected threat event, and based on a determination that at least the threshold period of time passed since the first-recorded date, determining that the at least one threat detection rule is the candidate for improvement. The operations may also include: determining a prioritization level for improving the at least one threat detection rule based on how much time passed since the first-recorded date, a higher prioritization level being determined in response to more time passing since the first-recorded date and a lower prioritization level being determined in response to less time passing since the first-recorded date, generating a task to improve the at least one threat detection rule, ranking the task in the prioritization scheme based on the corresponding prioritization level, and returning the prioritization scheme. The first-recorded date may include a date the information about the detected threat event was last updated with information. The first-recorded date may include a date that the detected threat event was first observed in the enterprise network. The first-recorded date may include a date that the detected threat event was last observed in the enterprise network.

Sometimes, the operations can also include determining how a threat actor associated with the detected threat event evolves their attack over time, the determining can be based on comparing attack information from a date that the detected threat event was first observed with attack information from a date that the detected threat event was last observed. The operations may also include: generating a visualization of an attack flow over time for the threat actor based on the comparison, and transmitting instructions to present the visualization to the one or more user devices that, when executed by the one or more user devices, causes the one or more user devices to present the visualization in the respective GUI displays.

In some implementations, determining, for the detected threat event, whether the at least one threat detection rule tagged to the detected threat event is a candidate for improvement can include: determining whether at least a threshold period of time passed since a date that the at least one threat detection rule was tested, and, based on a determination that at least the threshold period of time passed since the date that the at least one threat detection rule was tested, generating instructions to re-test and validate the at least one threat detection rule with the information about the detected threat event. The information about the detected threat event can be received from a network security system, the network security system being configured to, using the threat detection rules, (i) detect threat events in network traffic of the enterprise network and (ii) respond to the detected threat events. The enterprise network further can include a network interface having network sensors, the network sensors of the network interface being configured to (i) detect the network traffic that is ingested by the enterprise network and (ii) transmit the network traffic to the network security system. The network security system can be configured to (i) detect and respond to the threat events in the network traffic, (ii) transmit information about the detected threat events to the data store for storage and use by the threat intelligence computer system, and (iii) transmit benign traffic of the network traffic to one or more recipients.

The information about the detected threat event can be received from one or more third party systems that can be configured to monitor network traffic and generate threat information based on detecting one or more threat events in the monitored network traffic. The data source can include: a threat detection rules data store that can be configured to maintain the threat detection rules, a threat actor data store that can be configured to maintain information about threat actors that may be identified in association with threat events at the enterprise network, a malware data store that can be configured to maintain information about different types of malware that may be detected in the threat events at the enterprise network, and an associations data store that can be configured to maintain tagging information that may associate the threat events, the threat actors, and the malware with the threat detection rules. The instructions for improving the at least one threat detection rule can include instructions to identify additional information about the detected threat event. Sometimes, the instructions for improving the at least one threat detection rule can include threat data gaps, threat data freshness information, and threat detection rule and response performance.

The devices, system, and techniques described herein may provide one or more of the following advantages. For example, the disclosed technology can provide any of a variety of technical advantages for threat detection and responses of network security systems, such as improving efficiency by which potential changes in attacks posed by threat entities can be triaged and appropriately responded to by a network security system. Large volumes of network traffic can be received/ingested by enterprise networks, where the network traffic may include threat actor information and malicious traffic intended to attack and infiltrate the enterprise network. The disclosed technology can provide improved techniques to a technical problem and challenge in creating cohesive responses to various types of threat actors that are not redundant, duplicative, or resulting in rules that capture benign traffic or miss malicious traffic. The disclosed technology can provide for accurate and efficient threat detection rules and responses to be generated and/or improved by ingesting, triaging, and stitching together conceptually-related information related to malware, threat actions, and/or threat actors that may be posed by multiple different threat entities. As a result, a network security system's rules and responses can be improved and enhanced to accurately detect and stop malware and threat entities as their attacks continue to evolve over time.

In another example, the disclosed technology provides a unified platform for aggregating disparate information about security threats and threat entities, tagging these threats and/or actors with existing malware detection rules in the enterprise's security/threat intelligence system, identifying informational gaps regarding the threats and/or actors, measuring/assessing efficacy of the existing rules in detecting and responding to the threats and/or actors, and improving the rules and/or information collection/aggregation accordingly.

The unified platform can be simultaneously leveraged by various stakeholders and/or automated computer systems to accurately and efficiently improve the enterprise's security/threat intelligence system. For example, the disclosed technology may be used to generate a holistic view, depiction, and/or flow of threat actions and/or likely threat actions. Various interfaces can be provided for viewing aggregated information about rule performance and/or known security threats and/or actors to the enterprise's system. A user can view information about a particular security threat, whether and what rule was triggered/tested, and/or whether the rule was properly triggered. The interface can map out potential points along a system alerting pipeline that can cause rules to fail to trigger or otherwise not fire properly. This information can provide a more holistic view of the detection rules, which can assist the user, and/or the automated computer systems, to modify and/or update the rules as well as audit the entire security/threat intelligence system.

Similarly, the disclosed technology may use a standard format to pass various information about the threat actions and actors (e.g., entities), thereby ensuring that previously-gathered/analyzed information and newly collected information may be added to data representations of the threat actions and actors. Relevant users may easily collaborate to generate and/or modify the detection rules to continue blocking ever-changing threat actions and actors.

The disclosed technology may provide for continuous and automatic (i) collection of information associated with threat actions and actors and (ii) testing of detection rules to ensure that the rules work as designed and continue to respond to ever-changing threats. Such ongoing integrity checks can provide for testing and validating threat detection rules and their components as new security threats and/or actors are ingested into the enterprise's system and as associated information changes over time.

As another example, the disclosed technology can provide for increasing overall confidence of the enterprise's security/threat intelligence system. Since the detection rules may be continuously checked and/or validated, the relevant users can become more confident that the detection rules fire properly in response to actual threats and threat entities. Moreover, if the rules do not fire properly, such rules can be brought to the attention of the users in real-time or near real-time, who can respond immediately by modifying the rules accordingly. So long as the detection rules are continuously being checked, confidence in rule triggering and performance can be maintained and/or improved.

The disclosed technology can also provide an intelligence platform for tracking effectiveness of various cyber security practices and/or teams. The intelligence platform can provide analytics and metrics for tracking such effectiveness, which can further be used by the enterprise to improve their cyber security efforts.

The details of one or more implementations are set forth in the accompanying drawings and the description below. Other features and advantages will be apparent from the description and drawings, and from the claims.

In the present disclosure, like-numbered components of various embodiments generally have similar features when those components are of a similar nature and/or serve a similar purpose, unless otherwise noted or otherwise understood by a person skilled in the art.

DETAILED DESCRIPTION OF ILLUSTRATIVE EMBODIMENTS

This disclosure generally relates to technology for monitoring and identifying threat actions and actors, and evaluating an enterprise's threat intelligence responses (e.g., threat detection and response rules) to those threat actions and actors. The disclosed technology may be used to identify and associate information and/or threat detection rules with different types of threat actors, groups, affiliates, generalized threats, and other threat actions. The disclosed technology may combine various information from existing kill-chain models and other threat intelligence detection and response techniques into a threat actor (e.g., entity) matrix. The matrix, or similar data representations, may be continuously updated and store relevant information associated with threat actions and/or actors. The matrix may be used by the enterprise's threat intelligence system and/or relevant users (e.g., security analysts) to assess and improve the enterprise's threat responses/rules.

The enterprise's threat intelligence system may be configured to categorize tactics, techniques, and procedures of threat actors and/or threat actions into one or more phases of attack. Classification via the phases of attack may be used for analyzing the tactics, techniques, and procedures of the threat actors/actions in a linear fashion to further improve comprehension of a threat attack and evaluation of existing threat responses/rules to the threat attack. Sometimes, the disclosed technology may leverage, identify, and/or assess threat detection domains to further enhance information collection and assessment of the threat actions/actors. The collection of information about the threat actors/actions can be aggregated, using the disclosed technology, and further used to generate comprehensive attack flows that can be visualized and presented to relevant users in the enterprise. The attack flows can depict a course of action and/or a most likely course of action that any particular threat action/actor may take during an attack. Such visualizations can be presented in GUIs across devices of the relevant users and used to improve (e.g., automatically by the enterprise's threat intelligence system and/or manually by the relevant users) threat detection rules and other security responses of the enterprise.

Figure 1A:
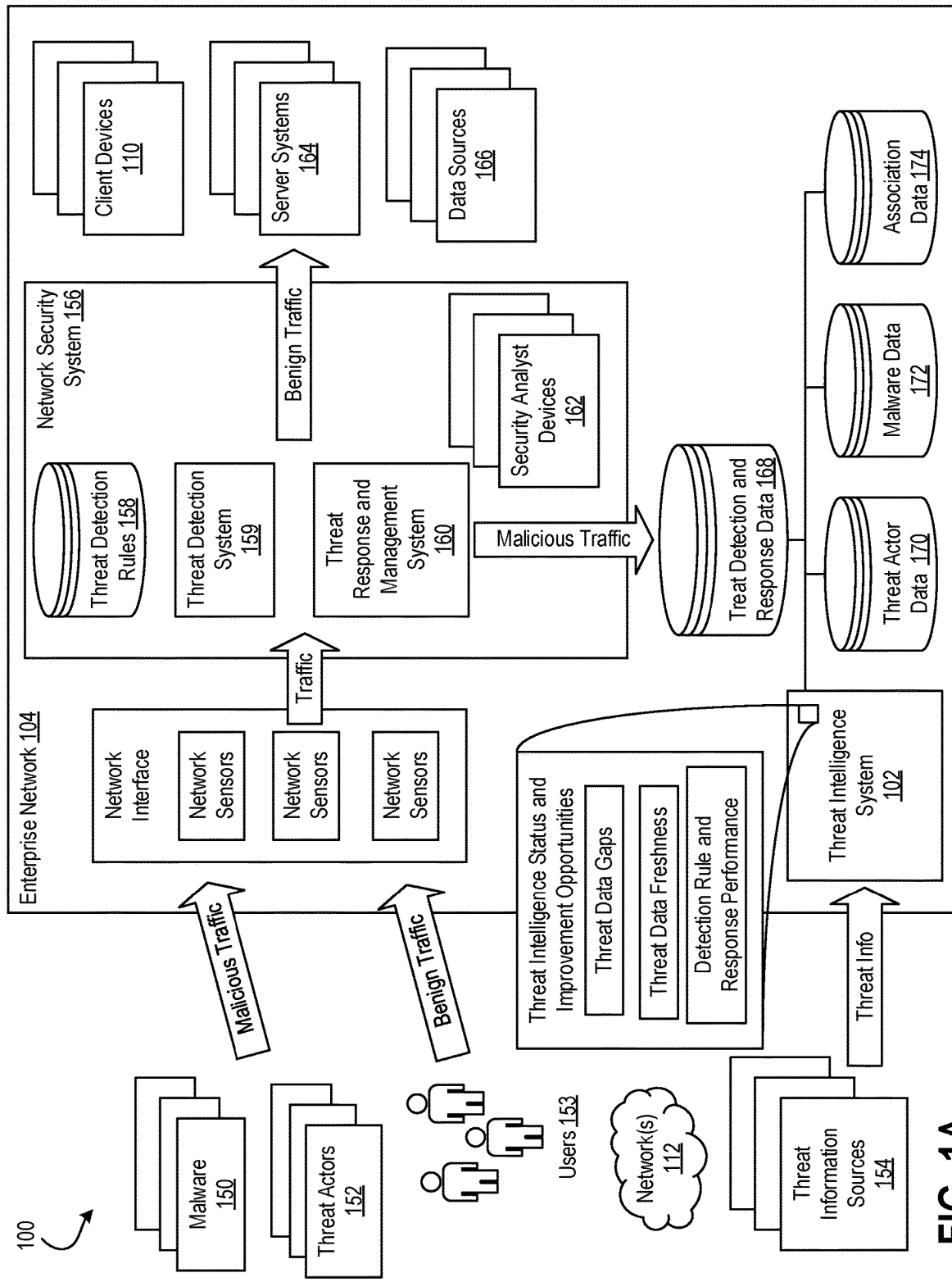
FIGS. 1A and 1B are conceptual diagrams of a system for monitoring threat actions and actors and evaluating enterprise threat intelligence responses to those threat actions and actors.
Figure 1B:
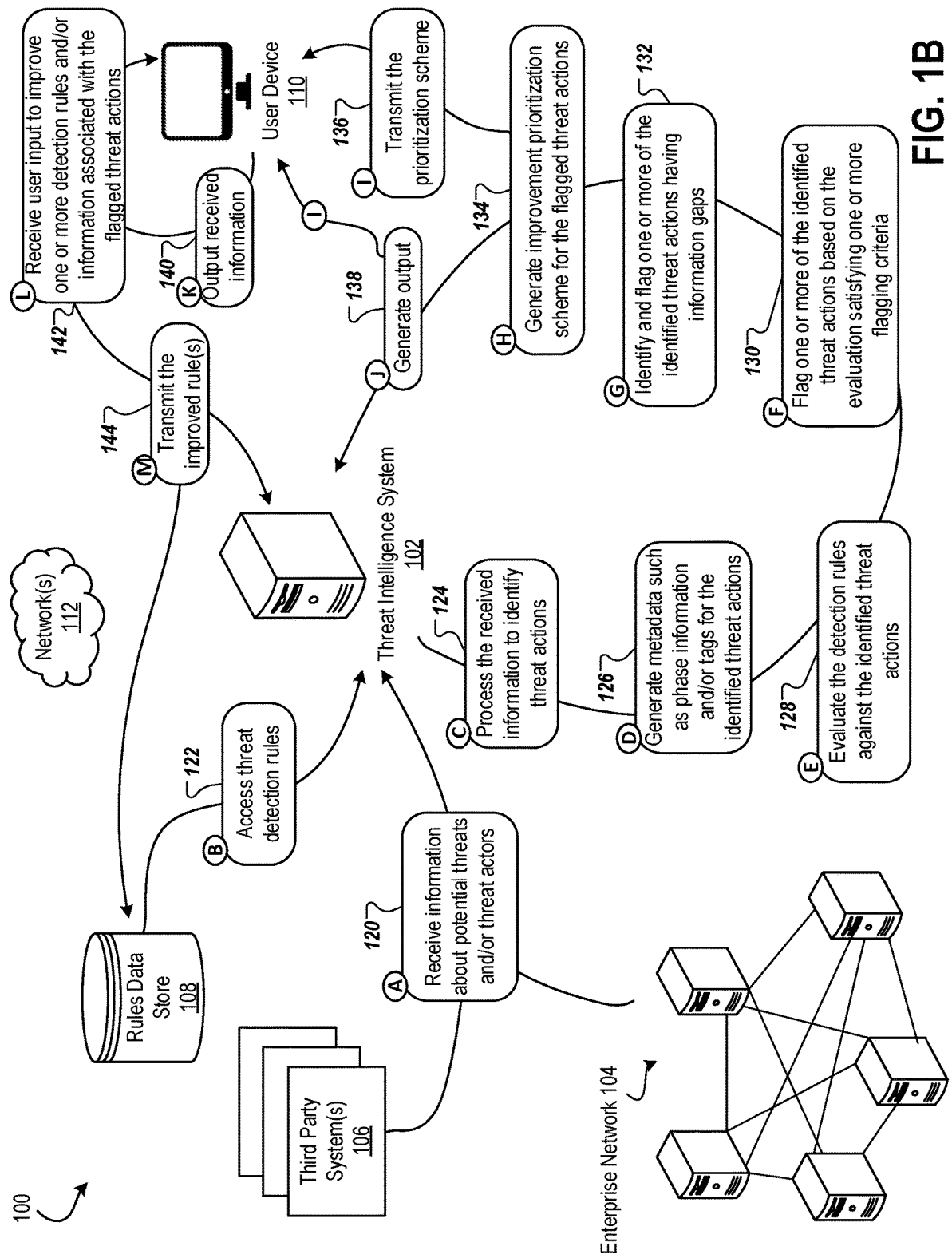

Referring to the figures, FIGS. 1A and 1B are conceptual diagrams of a system 100 for monitoring threat actions and actors and evaluating enterprise threat intelligence responses to those threat actions and actors. In FIG. 1A, various components of an enterprise network 104 can communicate with each other and external systems and devices via network(s) 112 to monitor, detect, respond to, and improve the enterprise's security system. The enterprise network 104 can receive various types of network traffic via a network interface. The network interface can include a plurality of network sensors that can be configured to detect the network traffic then route the traffic to a network security system 156. The network traffic can include malicious traffic, which may come from bad actors, such as malware 150 and/or threat actors 152 (e.g., threat entities, malicious entities). The threat actors 152 may send the malware 150 to the enterprise network 104, however sometimes the threat actors 152 and the malware 150 can be separate from each other. Users 153 (both related to or unrelated to the enterprise) may also transmit information to the enterprise network 104, such as benign traffic. Accordingly, the network interface can be configured to receive and ingest both malicious and benign traffic.

Once the traffic is detected by the network sensors in the enterprise network 104, the network interface can pass the traffic to the network security system 156. In some implementations, the network security system 156 can be the same as or part of a threat intelligence system 102 described further below (e.g., refer to FIGS. 1B and 5). As shown in FIG. 1A, the network security system 156 can be separate from other components, such as the threat intelligence system 102. The network security system 156 may include a threat detection system 159 and/or a threat response and management system 160.

The threat detection system 159 can be configured to access threat detection rules (e.g., YARA rules) from a threat detection rules data store 158 and apply those rules to the received traffic. The threat detection system 159 can use/ process the rules to determine whether the traffic is malicious or benign. The rules may be generated by one or more systems and/or relevant users in the enterprise (e.g., security analysts, security analyst devices 162). The rules may also be updated and/or modified over time, as described herein, based on threat detections, responses, and/or rule performance.

Moreover, the security analyst devices 162 can be any type of computing device described herein that can be used by security analysts. The security analysts can view, at their devices 162, rule performance and other information about the malicious traffic. The security analysts may triage information at their devices 162, update the rules, modify the rules, create new rules, create new responses to detected malicious traffic, update existing responses, etc.

If the threat detection system 159 determines that the traffic contains benign traffic, the benign traffic can be transmitted to relevant users, systems, and/or devices that are intended to receive such traffic. For example, the benign traffic can be sent/forwarded to one or more client devices 110, one or more server systems 164, and/or one or more data sources 166. If, on the other hand, the threat detection system 159 determines that the traffic contains malicious traffic, based on the traffic triggering one or more of the retrieved threat detection rules, the system 159 may pass the malicious traffic to the threat response and management system 160. The system 160 may access the rules in the data store 158, which can be used to address or otherwise prevent the malicious traffic from further infiltrating the enterprise network 104, infecting systems and/or devices, and/or carrying out a malicious intent of the traffic.

Information related to the malicious traffic, responses to the traffic, triggered rules, etc. may be transmitted from the system 160 to a threat detection and response data store 168. The data store 168 may also be in communication with or otherwise include sub-data stores for maintaining a variety of information about the malicious traffic and the network security system 156's responses to the malicious traffic. For example, the data store 168 can communicate with a threat actor data store 170, which can maintain information about particular threat actors 152 that have been identified over time. The data store 168 can communicate with a malware data store 172, which can maintain information about particular malware 150 that has been identified over time. The data store 168 can communicate with an association data store 174, which can maintain information associating the malware 150, the threat actors 152, the malicious traffic, and/or the triggered threat detection rules, and/or responses. The information for making such associations can include tags, which can be determined and applied to any of the above information automatically by the network security system 156 and/or manually by relevant users at the security analyst devices 162. All of the information described above in relation to the malicious traffic can be maintained, monitored, and accessed to improve the threat detection rules and responses over time.

For example, any of the information stored in the data stores 168, 170, 172, and 174 can be fed back to the threat detection system 159 to improve detection of the malicious traffic and/or improve/create threat detection rules that are maintained in the threat detection rules data store 158.

As another example, any of the information stored in the data stores 168, 170, 172, and 174 can be accessed by the threat intelligence system 102, which can be configured to monitor the information and determine opportunities for improvement in the network security system 156. The threat intelligence system 102 can interact with other systems and devices described herein to identify, flag, and automatically prioritize a large corpus of malware, threat actions, and/or threat actors. The threat actors 152 may be entities that create the malware 150 and/or other threat actions. The threat actions can be specific instances of attacks on the enterprise's internal network 104 (e.g., enterprise network) and/or enterprise devices. In some implementations, the threat intelligence system 102 can access and execute threat detection rules from the threat detection rules data store 158 in response to detecting the threat actions/actors in the traffic. The threat intelligence system 102 may associate threat action/actor information with various threat detection rules and other responses (e.g., with tagging techniques) to evaluate how the enterprise's security system responds to the threat actions/actors. Based on the associations and other information aggregation techniques, the threat intelligence system 102 can determine and generate prioritized opportunities for threat detection rule and response development and/or improvement. The threat intelligence system 102 may also use the information associations and aggregations to generate and prioritize opportunities for improving intelligence/information gathering tactics of the enterprise, which further may improve robustness of data representations of the threat actions/actors that can be used by the threat intelligence system 102 and/or relevant users or other systems and components of the enterprise to generate and improve threat detection rules and other responses.

For example, the threat intelligence system 102 may receive information from any of the data stores 168, 170, 172, and 174 and/or other threat information from threat information sources 154 (e.g., third party systems). The system 102 can aggregate and process the received information to determine threat intelligence status and/or improvement opportunities. Such status and/or opportunities can include, but are not limited to, threat data gaps (e.g., informational gaps, whether sufficient data or other information exists to identify and track an attack flow of a particular threat actor, malware, or other threat action(s)), threat data freshness (e.g., how recently the threat data was collected and/or updated), detection rule and response performance (e.g., whether a rule triggered, whether the right rule triggered, whether a response was adequate). The status and/or opportunities determined by the threat intelligence system 102 may be transmitted to the security analyst devices 162 or devices of other relevant users in the system 100 and used to improve the threat detection rules, information collection, and/or responses to ever-changing malware 150 and/or threat actors 152. The threat intelligence system 102, its components, and processes performed by the system 102 are described further below.

In the system 100 of FIG. 1B, the threat intelligence system 102 communicates with a rules data store 108, third party system(s) 106, enterprise network 104, and/or user device 110 via network(s) 112. The threat intelligence system 102 can be configured to aggregate and analyze threat actions and/or threat entities to generate intelligence packages for review and action. In other words, the threat intelligence system 102 can stitch together information about the threat actions/entities and associated threat detection rule triggering, performance, and/or updates. The intelligence packages can include a variety of information received from disparate sources (e.g., the third party system(s) 106, the enterprise network 104) and/or generated by the threat intelligence system 102 that document and/or describe the threat actions/actors. Intelligence-specific tags may be added (by relevant users and/or automatically by one or more computer systems described herein) to the information associated with the threat actions/actors to link the information to threat detection rules and other responses of the enterprise. Categorizing the information according to tags can allow the threat intelligence system 102 to automatically document the threat actions/actors, thereby causing the enterprise's threat responses to be measured by whether or not those responses are meeting and appropriately responding to intent of the threat actions/actors.

The threat intelligence system 102 can receive information about potential threat and/or threat actors from the third party system(s) 106 and/or devices in the enterprise network 104 (block A, 120). The threat intelligence system 102 may also access threat detection rules in block B from the rules data store 108 (122). In some implementations, the rules can be accessed before, during, or after one or more other blocks described below in reference to FIG. 1B. As an illustrative example, the intelligence system 102 can tag or otherwise associate the potential threat action/actor with a threat detection rule or type of expected threat response. The system 102 may then identify and retrieve rules from the rules data store 108 that are associated with the tag.

The threat intelligence system 102 can process the received information to identify threat actions/actors in block C (124). For example, the threat intelligence system 102 (and/or relevant users such as security analysts) can compare the received information to data representations of known threat actions/actors to the enterprise to determine whether the potential threats and/or actors have attacked the enterprise in the past and/or whether the enterprise has existing response strategies that are appropriate to address the potential threats/actors.

The threat intelligence system 102 can generate metadata such as phase information and/or tags for the identified threat actions (block D, 126). The system 102 can provide for matrixing phases of attack with detection domains to generate a holistic viewing of tactics, techniques, and procedures of the threat actions/actors from both an intel side (phases of attack) and detection techniques (detection domains). As a result, the matrixing techniques can be used to ensure efficiency in sharing, aggregating, and maintaining current up-to-date information about the threat actions/actors. Refer to FIGS. 2A and 2B for further discussion about matrixing the threat actions/actors. The threat actions/actors can be classified and/or tagged based on their phases of attack. Such classifying/tagging can help create associations between where and when the threat actions/actors occur and threat response rules that correspond to those phases.

Figure 2:
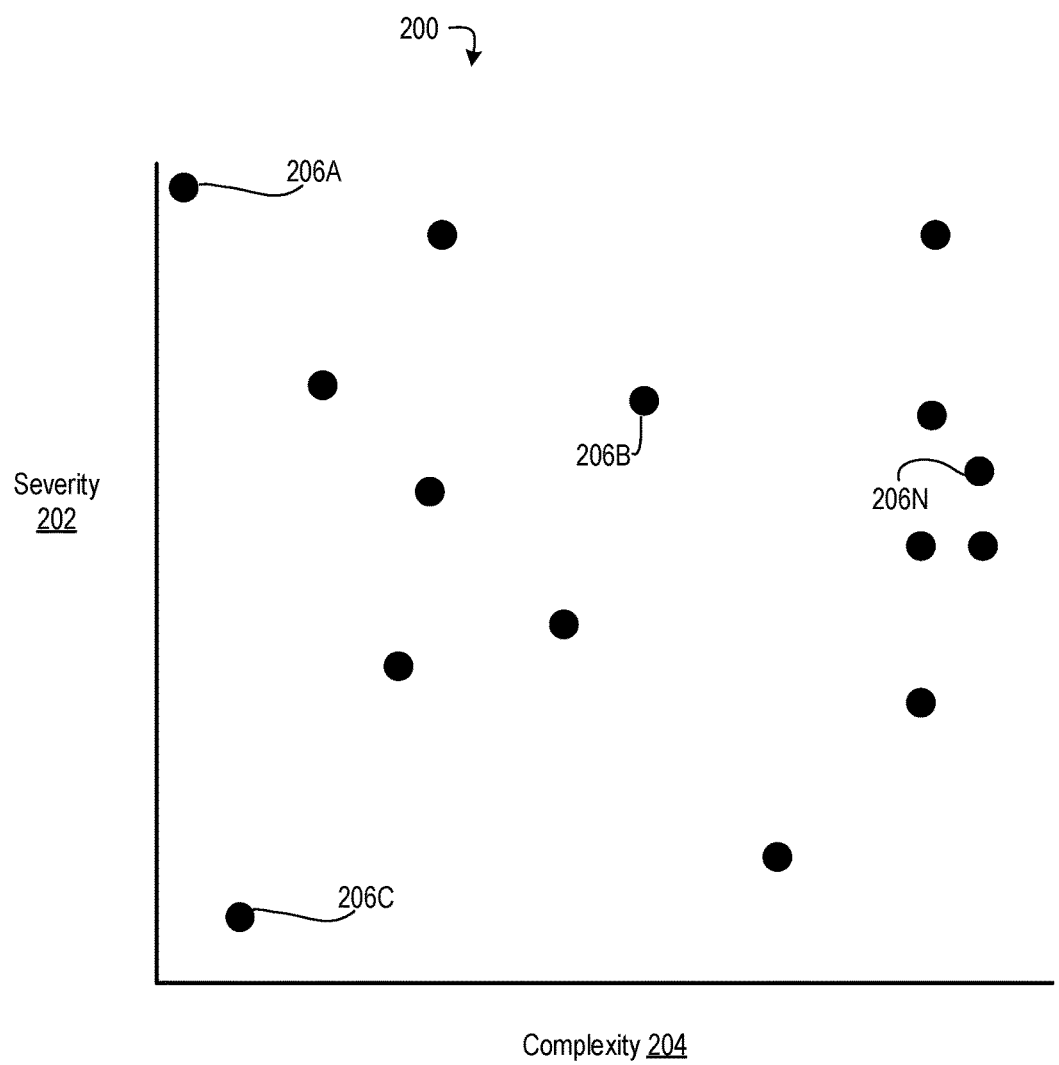
FIG. 2 shows a graph illustrating severity and complexity metrics of threat actions and/or actors to the enterprise and a table illustrating phase detection of various threat actions to the enterprise.

Refer to FIG. 2 for further discussion about the phases of attack. The detection domains can be locations in the enterprise network 104 boundary at which threat actions/actors may be observed/identified. The detection domains may include external, ingress, internal, and egress. External activity can include any activity occurring outside of the network that is trackable, such as infrastructure, malware collection, dark web tracking, etc. Ingress activity may include any activity inbound from outside the network, such as network connections, files in transit, email traffic, etc. Internal activity may include any activity that occur on hosts or servers, such as process execution, inside the network. Egress activity can include any activity leaving the network, such as command and control communications, HTTP connections, etc.

Performing block D (126) may additionally or alternatively include generating, collecting, and/or aggregating information directly pertaining to the potential or detected threat actions (tactics, techniques, and procedures), information related to sharing and analysis of the threat actions, descriptions of the threat actions, strings, arguments, commands, and/or scripts that are documented, reported on, and/or pulled from samples that demonstrate the use of the threat actions. Any of this information may be automatically generated by the threat intelligence system 102, such as by using AI techniques and/or machine learning models. In some implementations, the threat intelligence system 102 may use text-based analytics, rulesets, and algorithms to suggest and/or identify techniques, tactics, and procedures of threat entities. Any of this information may additionally or alternatively be manually generated by the relevant users, such as security analysis. Sometimes, the information generated in block D (126) may include a prioritization scheme based on prevalence of the threat actions within an attack, sources that describe or record use of the threat actions in an attack by any particular threat actor, etc.

Sometimes, the information generated in block D (126) may additionally or alternatively include a date that the threat action was first recorded, a date the threat action was last updated (meaning another source reported on the threat action, more strings were found, a sample involving the action was added to a collection associated with the action), a date that the threat action was first observed, a date the threat action was last observed, etc. Identification and documentation of dates described herein may be used to track maturity of threat detection rules and other security responses to ensure that detection creation closely follows threat action creation and development over time.

As an illustrative example, creation date information can be compared to first observed date information to determine how long it takes the disclosed technology to discover threat actions by certain threat actors. This time delay may depend on factors, such as how noisy the attacks are, an amount of open source reporting, and whether the disclosed technology has visibility through uploads and collection of relevant information about the threat actions. As another illustrative example, the first observed date can be compared to last observed date to identify how a threat actor evolves their attack flow(s) over time. The amount of time a threat action is used, along with its correlating prevalence level, can indicate how quickly a threat actor upskills, how many individuals may be involved in the threat actor, and/or how quiet the threat actor is if they are able to continuously use the same threat actions for long periods of time. Updated date information can be used by the threat intelligence system 102 to determine when a data representation of a threat action last had intel/information/intelligence added to it, and may indicate when a threat action should be analyzed further, such as if too much time has passed since the last time information was collected and/or analyzed for the particular threat action. Any of the information generated in block D (126) can be aggregated, associated with the particular threat action/actor, and/or stored with the association in a data store, as described and depicted in FIG. 5.

The threat intelligence system 102 can evaluate the accessed detection rules against the identified threat actions (or actors) in block E (128). Block E can sometimes be performed before, during, or after one or more other blocks described in reference to FIG. 1B. Refer to FIGS. 6, 7A, 7B, 8, 9, 10A, and 10B for further discussion about evaluating the enterprise's responses to identified threat actions/actors.

In block F, the threat intelligence system 102 can flag one or more of the identified threat actions based on the evaluation of the detection rules satisfying one or more flagging criteria (130). For example, the system 102 may determine that the expected detection rules are not triggering as frequently on the identified threat actions as they should. As another example, the system 102 may determine that the identified threat action is subverting one or more detection rules that are tagged and otherwise associated with the identified threat action, which can indicate that the detection rule(s) have not been updated over time as the identified threat actions evolved.

The threat intelligence system 102 can identify and flag one or more of the identified threat actions having information gaps in block G (132). Sometimes, block G can be performed as part of block F (130). Sometimes, block G can be performed instead of block F. In some implementations, blocks F and/or G can be performed as part of evaluating the detection rules against the threat actions in block E (128). In block G, the system 102 can determine whether current information is known, aggregated, and/or assessed for the particular identified threat action(s). The system 102 can implement one or more machine learning models and/or AI techniques to identify and flag the informational gaps so that the gaps can be brought to the attention of the relevant users and addressed accordingly. Identifying and addressing the information gaps on an ongoing basis can allow for a knowledge base/repository about known threat actions/actors to be maintained by the threat intelligence system 102 and used to improve the enterprise's threat detection rules and other responses.

In block H, the threat intelligence system 102 may generate an improvement prioritization scheme for the flagged threat actions/actors (134). The prioritization scheme can be based on a severity level that is determined by the system 102 for each of the flagged threat actions/actors. For example, if a threat actor infiltrated the enterprise network 104 and no rules were identified by the system 102 as triggering in response to the attack, this threat actor can be prioritized and elevated to a top of the prioritization scheme for review by the relevant users and/or the system 102. As another example, if a threat action routinely hits the enterprise network 104 and a corresponding rule triggers but misses some of the hits, then the routine threat action can be lower in the prioritization scheme than the threat actor described above. After all, although the triggered rule may need to be updated and/or new information may be collected/aggregated/analyzed for the routine threat action, the routine threat action may pose less of an immediate security risk/threat to the enterprise network 104 than the threat actor describe above.

Generating the prioritization scheme can include creating tasks to triage new information received at the threat intelligence system 102 and then analyzing the triaged information (e.g., how capable are the threat actors and how likely are they to be targeting the enterprise network 104) to determine prioritization of internal security team tasks in evaluating, improving, and/or developing threat detection rules and other responses.

Generating the prioritization scheme may include generating tasks to be performed to improve the threat detection rules and other responses. For example, the system 102 can generate tasks to evaluate the effectiveness of one or more of the threat detection rules. As described further in reference to FIGS. 8, 9, 10A, and 10B, the tasks may include generating and using synthetic network events to evaluate rule effectiveness in stopping/addressing those events. As mentioned above, the system 102 may generate tasks to collect more information about how various threat actors exploit networks and other relevant threat actor information.

In some implementations, generating the prioritization scheme can include generating an attack flow for a particular threat action/actor, which can resemble a blueprint of an attack. The attack flow can place the threat action/actor into its respective phase of attack coupled with a prevalence level and/or detection domain (refer to lock D, 126). Combined, this information may show a most likely path that a threat actor may take to reach their objective and thus provide guidance to the relevant users and/or the threat intelligence system 102 in generating responses and/or improving existing responses to the threat actions/actors.

Still referring to block H (134), the prioritization scheme can indicate prevalence of threat actions within the threat actor's attack flow, such as when the actions are identified in most attacks by that threat actor, and/or prevalence of the actions across multiple threat actors, such as when the actions are identified in attacks by many threat actors. Some threat actions can have high prevalence both within and across threat actors, which indicates that the actions may be performed by many if not most threat actors. These actions may be important to detect and respond to (and can be flagged and identified as such in the prioritization scheme). Threat actions that have low prevalence both within and across threat actors may be seen in fewer attacks and thus be lower priority. Threat actions that have high prevalence within threat actors but a low prevalence across threat actors may commonly appear in some types of attacks (e.g., MAZE attacks), but may not be used in attacks by other ransomware groups. As a result, these actions may potentially be attributable to a particular threat actor, which allows for the disclosed technology to identify these actions with a higher confidence level of attribution to the particular threat actor. Some actions may have a low prevalence within threat actors, but a high prevalence across the threat actors. These actions may not be seen in many attacks performed by a particular threat actor, but may be observed in attacks using several different ransomware variants. This analysis may indicate that these actions are attributable to an affiliate belonging to multiple affiliates. Various other information can be determined and/or identified in the prioritization scheme.

The threat intelligence system 102 may transmit the prioritization scheme to the user device 110 (block I, 136). The system 102 may additionally or alternatively generate output in block J (138). The output can include one or more GUI displays described herein (e.g., refer to FIGS. 2A, 2B, 3A, 3B, 3B (cont), 3C, and 3D), which can then be transmitted to the user device 110 (block I, 136).

The user device 110 can output the received information from the threat intelligence system 102 (block K, 140). The user device 110 may also receive user input to improve one or more of the detection rules and/or information associated with the flagged threat actions (block L, 142). The user input can be received in response to and based on the prioritization scheme, which may be presented in the GUIs at the user device 110. The improved rule(s) can be transmitted to the threat intelligence system 102 and/or the rules data store 108 (block M, 144). In some implementations, the threat intelligence system 102 may further refine/adjust and/or test the improved rule(s). In some implementations, the user device 110 can be the same as one or more of the security analyst devices 162 described in reference to FIG. 1A.

FIG. 2 shows a graph 200 illustrating severity and complexity metrics 202 and 204, respectively of threat actions and/or actors 206A-N to the enterprise described herein. A threat intelligence computer system as described herein can process a variety of information about the threat actions/actors 206A-N to determine severity and/or activity levels associated with each of the threat actions/actors 206A-N. A severity level can be determined based on applying one or more rules to the information that indicates capability (e.g., observed capability) of the threat actions/actors 206A-N to infiltrate the enterprise's network. An activity level can be determined based on applying one or more rules to the information that indicates intent (e.g., frequency of attacks) of the threat actions/actors 206A-N. The computer system can further generate a threat score for each of the threat actions/actors 206A-N, which may be based on a combination of the corresponding severity level and activity level (e.g., summation, average, mean, median).

Mapping the threat actions/actors 206A-N into the graph 200 according to their respective severity level, activity level, and/or threat score can create a visualization of the enterprise's threat intelligence system and weak points. The graph 200 may be used to prioritize potential threat actions/actors 206A-N, where more information is needed about those threat actions/actors 206A-N, and/or where corresponding detection rules and responses may need to be updated, improved, and/or created. Any of the threat actions/actors 206A-N appearing in a top right quadrant of the graph 200 may be prioritized (increased severity and increased complexity) over other threat actions/actors in other quadrants of the graph 200 (e.g., threat actions in a left ⅓ of the graph 200 may have a range of severity but low complexity, thus posing lesser of a threat than a threat actor that has sufficiently greater complexity and the same or more severity). In some implementations, the graph 200 may be used to identify and prioritize only threat actors (not specific threat actions) that satisfy one or more severity and/or complexity criteria.

In some implementations, the graph 200 can be a heatmap. A relevant user may adjust placement of one or more threat actions/actors 206A-N in the graph 200 as presented in a graphical user interface (GUI) display at the user's computing device by dragging the threat actions/actors 206A-N position in the graph 200. If a position of a particular threat action/actor is changed on the graph 200, their corresponding severity level and/or activity level may be automatically updated and saved in a corresponding data representation for that action/actor.

In some implementations, the threat actions/actors 206A-N may be displayed in the graph 200 according to a corresponding capability level (instead of the severity metric 202) and a corresponding intent level (instead of the complexity metric 204). In some implementations, one or more of the metrics used for graphing the threat actions/actors 206A-N may include volume of attacks by the threat actions/actors 206A-N and/or volume of information available and/or received in association with the threat actions/actors 206A-N.

FIG. 2 further shows a table 210 illustrating phase detection of various threat actions, or malicious activity, to the enterprise. The malicious activity A-N can be assigned a priority level based on computer-based assessment of relevant information associated with each of the malicious activities. The priority level can be determined based on prevalence of tactics, techniques, and/or procedures within the malicious activity A-N attacks. In the illustrative example of the table 210, an indication of "Strong" corresponds to a high prevalence, an indication of "Medium" corresponds to a medium prevalence, an indication of "Weak" corresponds to a low prevalence, and an indication of "Blank" indicates to no prevalence (e.g., absence of the tactics, techniques, and/or procedures within the malicious activity A-N).

Regarding high prevalence malware (or threat) actions, such actions may be seen/identified in a majority of attacks performed by a threat actor. The "Strong" indication may be used when the action is seen in approximately ⅔ or more of attacks on the enterprise's network. The medium prevalence actions may include those identified in several but not a majority of attacks performed by the threat actor. The "Medium" indication may be used when the action is seen in approximately half the attacks. The low prevalence actions may include those identified in only a few attacks performed by the threat actor (e.g., less than a predetermined threshold quantity of attacks). The "Weak" indication may be used when the action is seen in ¼ or less of the attacks. One or more other indicators, values, string values, integers, Boolean values, patterns, and/or colors may be used to indicate the prevalence of various actions in threat attacks. As an illustrative example, a plurality of colors and/or shades of colors can be used to represent varying degrees of prevalence of the tactics, techniques, and procedures of the threat entities in the attacks on the network enterprise. For example, darker shades of a particular color can indicate higher prevalence of the tactics, techniques, and procedures in the attacks while lighter shades of the particular color may indicate lower prevalence of the tactics, techniques, and procedures in the attacks.

Still referring to the table 210, various attack phases may be defined, which can vary based on the enterprise network and what types of attacks and/or threat actors are most relevant to the enterprise. As an illustrative example, the phases of attack may include, but are not limited to, intrusion, host activity, propagation, and end goal. The intrusion phase can encompass tactics, techniques, and procedures of the threat actors to gain entry to the enterprise's network. The actions of the threat actors during the intrusion phase may sometimes only be performed once throughout an attack. When these types of actions are identified, they may indicate the beginning of an attack. The host activity phase may include any other actions of the threat actors while on a host in the enterprise network. The threat actor may use the infected host to perform a bulk of operations during the attack. These actions may or may not include communications with outside infrastructure. The propagation phase can include actions used by the threat actor to move across the enterprise's network to gain access to new hosts. The threat actor may cycle between host activities and propagation until they reach their objective. The end goal phase may encompass actions used by the threat actor to achieve their objective. These actions may not signal the end of an attack, since many threat actors may continue to reside in the enterprise's network to perform further attacks.

Figure 3A:
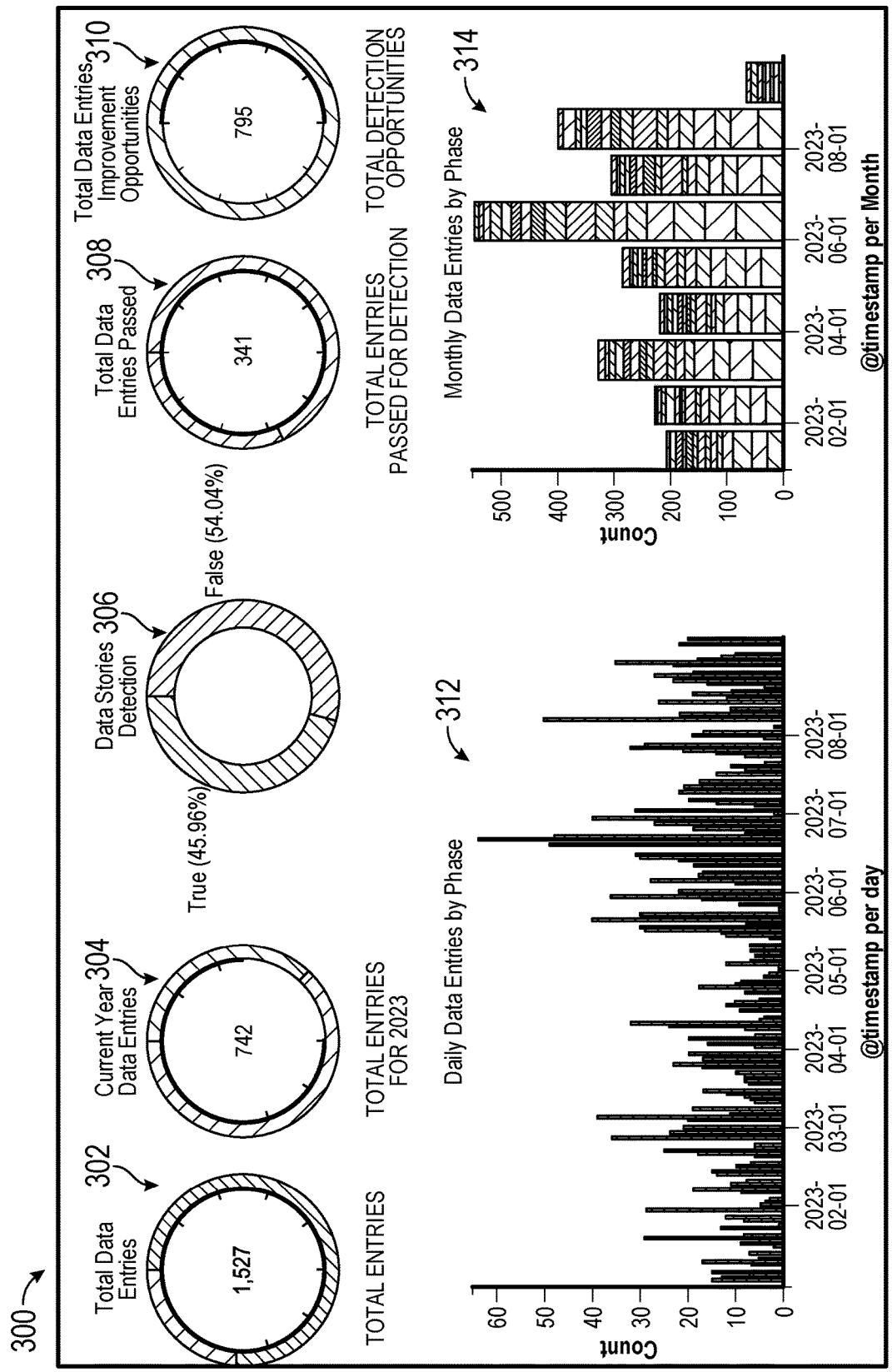
FIGS. 3A, 3B, 3B (cont), 3C, and 3D illustrate graphical user interface (GUI) displays depicting metrics for measuring threat detection, threat responses, and rule performance in the enterprise.
Figure 3B:
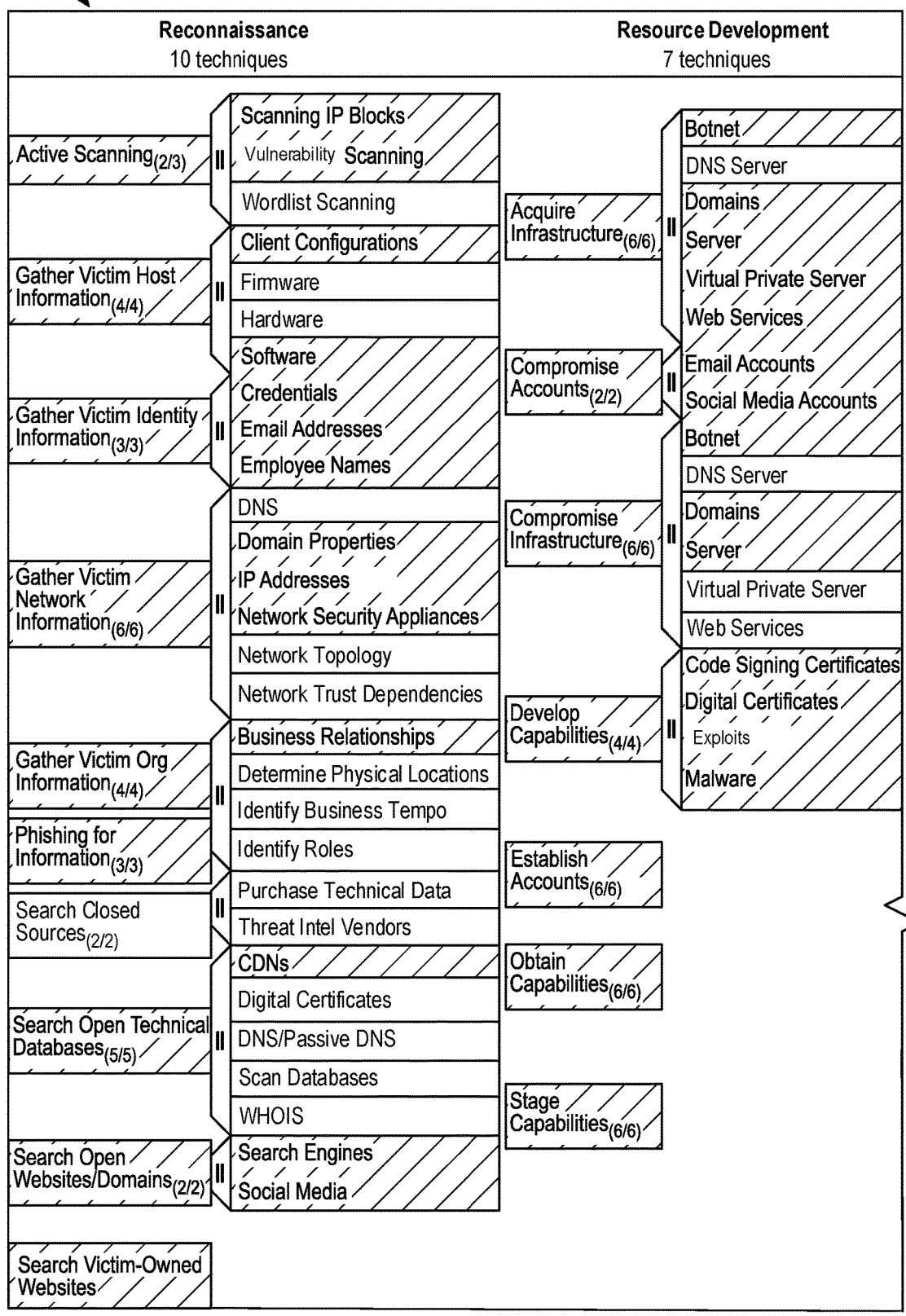
Figure 3B:
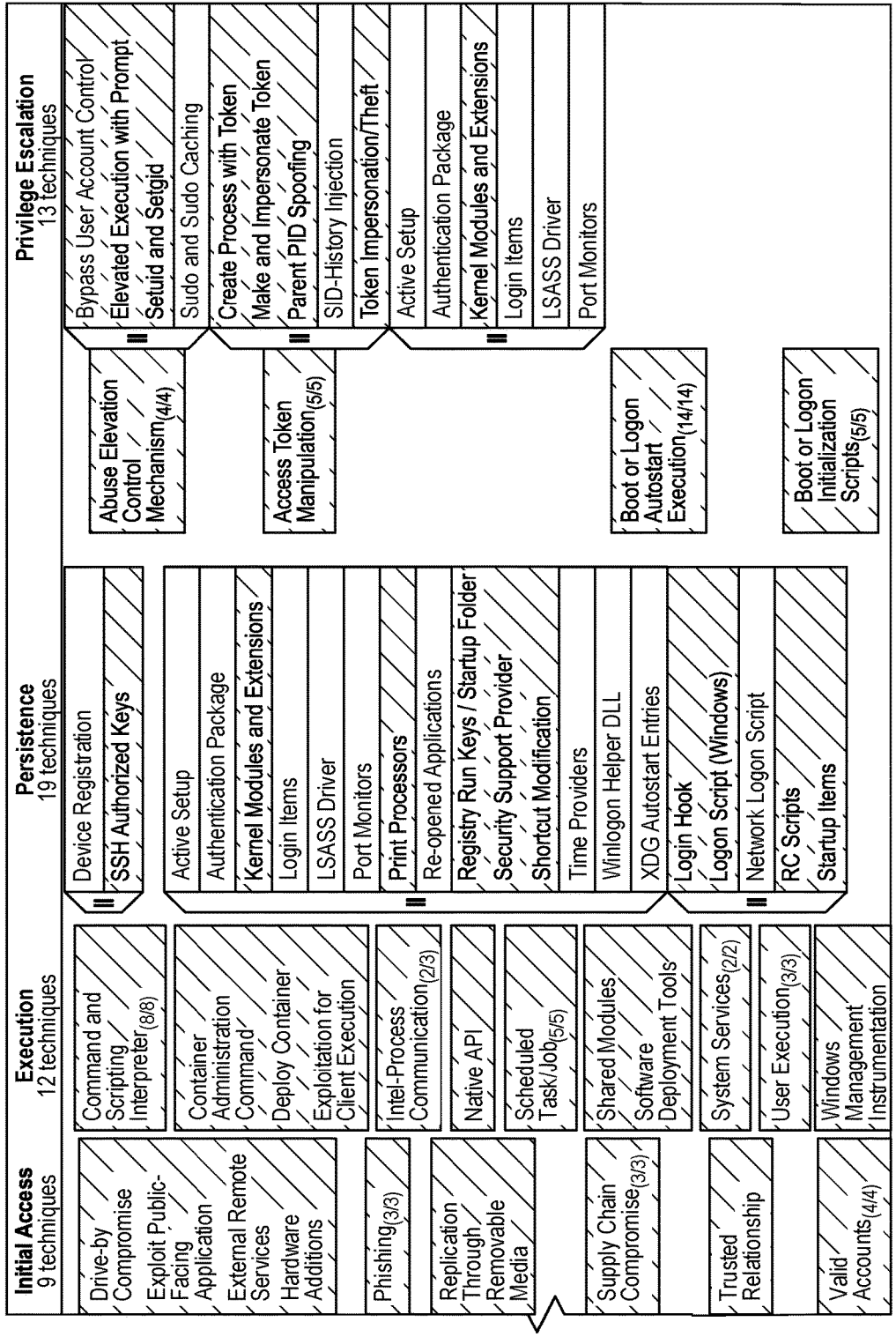

FIGS. 3A, 3B, 3B (cont), 3C, and 3D illustrate graphical user interface (GUI) displays 300, 330, 340, and 350 depicting metrics for measuring threat detection, threat responses, and rule performance in the enterprise. The GUIs 300, 330, 340, and 350 can be provided in a web application at different types of user devices described herein of relevant users to the enterprise (e.g., security teams, security analysts, fraud teams, detection teams). The GUIs 300, 330, 340, and 350 can provide standardization of information associated with threat actions and threat actors to the enterprise, categorization of the information, metrics and key performance indicators around the information and processes described herein, and streamlining and automation of information assessments (either performed automatically by the computer systems described herein or manually by one or more of the relevant users). The information presented via the GUIs 300, 330, 340, and 350 can further be used to improve threat detection rules and responses to the threat actions/actors over time.

In some implementations, the GUIs 300, 330, 340, and 350 can include selectable features, filters, and/or search functions for the relevant users to view different information therein. The users may filter the information based on enterprise ransomware to identify detection opportunities, as one example. As another example, a user can select options to filter based on active threat actions/actors. The user may select options to view static information associated with a particular threat actor. Selecting the options to view the static information can also cause the computer systems described herein to retrieve other information/intelligence associated with the particular threat, which may be displayed in one or more tables or other graphical elements shown and described. The other information can include, but is not limited to, linked techniques, associated actors/actions, recent references, tags, etc.

As another example, the user can select options to view and search all information related to all threat actions/actors.

Any additional information may be automatically pulled into various views based on what threat actors are tagged to that information. The relevant user may create, edit, and/or delete tags, as well as disable and/or merge tags for one or more of the threat actors/actions. Only activated tags may appear as selectable options in an intelligence/information input view of any of the GUIs 300, 330, 340, and 350. Merging tags can change all associated information into the merged tag, and disable the other tags that were selected to be merged.

In the illustrative GUI 300 of FIG. 3A, graphical elements are presented for total data entries 302, current year data entries 304, data stories detection 306, total data entries passed 308, total data entries improvement opportunities 310, daily data entries by phase 312, and monthly data entries by phase 314. Fewer, additional, or other data metrics can be presented and visually displayed in the GUI 300.

The total data entries element 302 can visually present a quantity of information that has been ingested by the enterprise's threat intelligence system regarding threat actions/actors. The quantity can correspond to a predefined time period (e.g., a past day, a past, a past month, all time total). The current year data entries element 304 can visually present a quantity of information ingested by the enterprise's threat intelligence system regarding the threat actions/actors over the current year. The data stories detection element 306 can visually present a percentage of intelligence entries (e.g., ingested information) that may include an opportunity for detection to be created. The total data entries passed element 308 can indicate a quantity of the intelligence entries (e.g., ingested information) that include opportunities for detection to be created. The total data entries improvement opportunities element 310 can indicate a total amount of opportunities for detection to be created within the intelligence entries. Some intelligence entries may include more than one opportunity for detection to be created. Thus, the amount of detection opportunities may be greater than a total amount of intelligence entries that include or may include detection opportunities. The daily data entries by phase element 312 may graphically present on a daily basis when the information corresponding to different predefined attack phases for the enterprise is ingested by the threat intelligence system. The monthly entries by phase element 314 may graphically present on a monthly basis when the information corresponding to the different predefined attack phases is ingested. Accordingly, the elements 302-314 of the GUI 300 may provide a holistic view of the various threat actions/actors for the enterprise as well as more granular views of when and how often the threat actions/actors are identified for the enterprise. The holistic view of information can help relevant users in the enterprise generate, modify, and/or update threat detection rules and other responses to improve the robustness and adequacy of the enterprise's threat intelligence system.

The illustrative GUI 330 of FIGS. 3B and 3B (cont) illustrates a mapping of intelligence (e.g., ingested information) that an enterprise may have regarding one or more tactics, techniques, and/or procedures of threat entities/actors. In some implementations, the GUI 330 or similar GUIs can present a mapping of detection rules that the enterprise has regarding these known tactics, techniques, and/or procedures of threat entities/actors. The GUI 330 and similar GUIs may be used to identify what intelligence and/or detection currently exists within the enterprise to address the known threat entities/actors, where gaps may exist in the current intelligence and/or detection, and what tactics, techniques, procedures, and/or threat entities/actors may need to be researched or analyzed further.

As an illustrative example, the intelligence presented in the GUI 330 can be mapped to MITRE ATT&CK tactics, techniques, and procedures to display what intelligence the enterprise may have with respect to those tactics, techniques, and procedures. MITRE ATT&CK and other similar frameworks can provide ways to categorize and understand different types of tactics, techniques, and procedures of different types of threat entities/actors. Such frameworks can provide buckets and/or labels that assign definitions to various types of cyber-attacks. The enterprise's security network described herein can expand upon such frameworks by providing high-level groupings that analysts and other relevant users may use for assessing cyber-attacks. For example, the disclosed computer systems and/or analysts may tag any intelligence regarding the cyber-attacks with MITRE-specific labels and other labels that are generated and defined by the enterprise network.

Figure 3C:
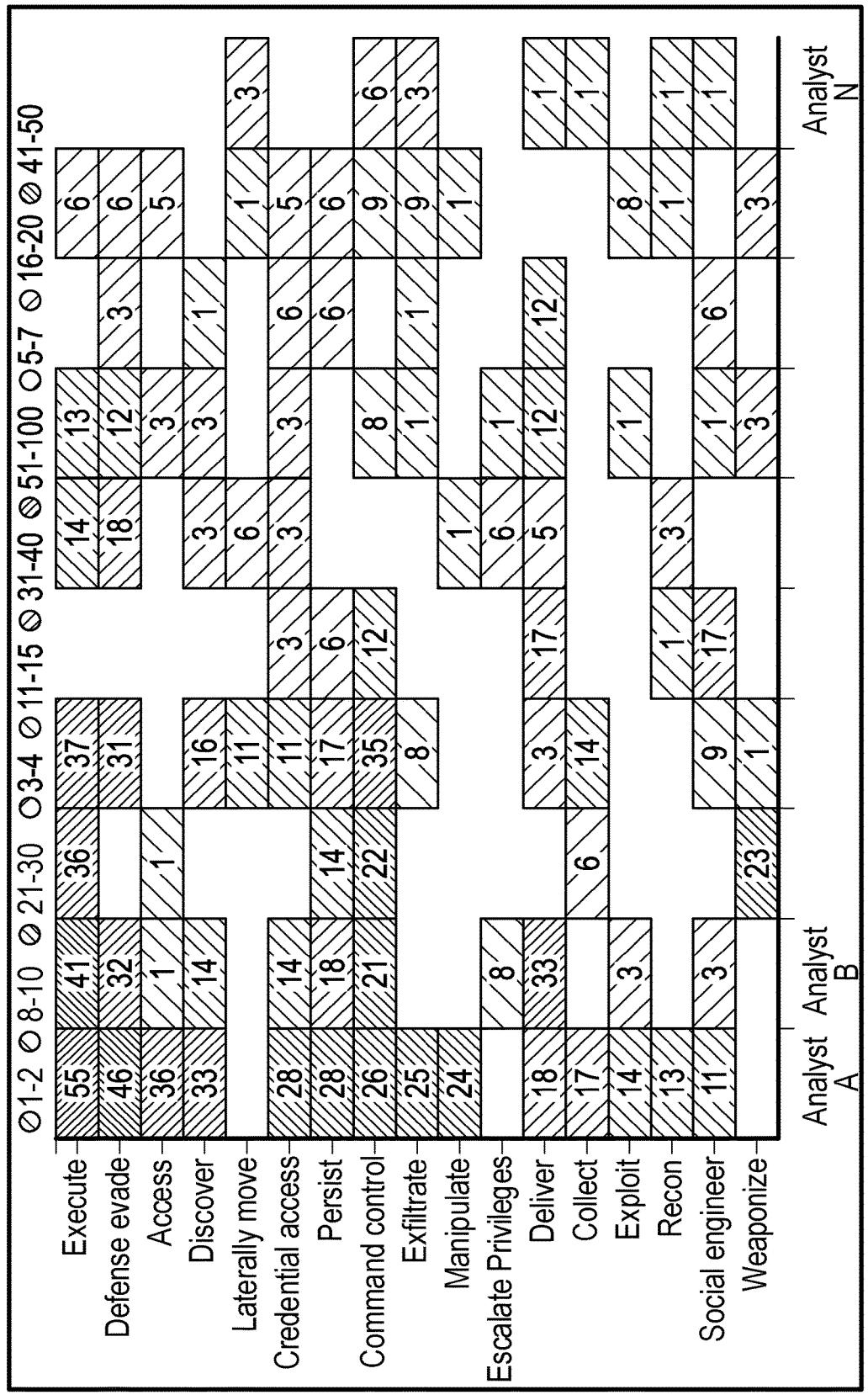

The illustrative GUI 340 of FIG. 3C displays a heatmap indicating security analysts in the enterprise who may be passing opportunities for detection to engineers or other relevant users in the enterprise. The heatmap further displays what type of tactic, technique, and/or procedure the passed detection opportunities are for. Each column in the heatmap can be associated with a particular security analyst. A Y-axis of the heatmap indicates one or more predefined tactics, including but not limited to execution, discovery, lateral moving, etc.

The GUI 340 can be used by relevant users in the enterprise, such as managers, to identify metrics that can be used to provide rewards to security analysts and to identify areas having gaps in which to work on with the security analysts. As a result, information presented in the GUI 340 can be used to improve performance of the security analysts and overall security team in the enterprise, thereby enhancing overall security of the enterprise's network.

The heatmap can be color-coded, in some illustrative examples. Different shades of color (or patterns or other type of visual indicia) can be used to indicate degrees of volume or count per category. For example, a lighter color or a lighter shade can indicate that fewer opportunities are being passed for detection. The lighter color may also indicate intelligence gaps that the analysts can focus on. A darker color or a darker shade can indicate higher volumes or counts regarding opportunities that are passed for detection. The color-coding and/or different shades of color may also correspond to numeric values, integer values, or other string values indicating volumes or counts that opportunities are passed for detection. For example, low numeric values, such as 1-10, can indicate lower volumes or counts regarding opportunities that are passed for detection while higher numeric values, such as 90-100, can indicate higher volumes or counts regarding opportunities that are passes for detection.

Figure 3D:
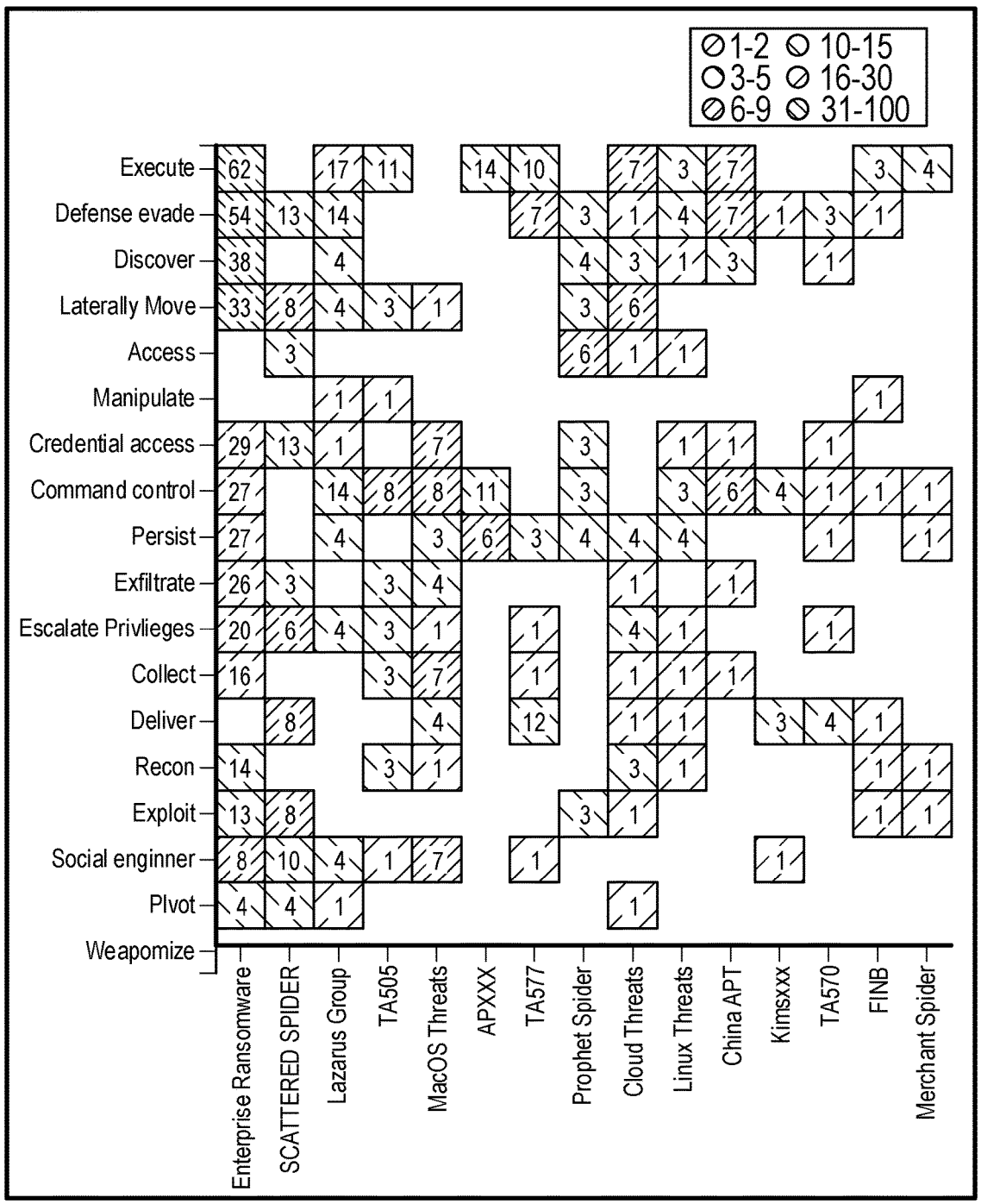

The illustrative GUI 350 of FIG. 3D displays a heatmap indicating, for a given threat actor, what intelligence (e.g., ingested information) has had detection opportunities included, and what tactics, techniques, and procedures are associated with those detection opportunities. A Y-axis of the heatmap indicates one or more predefined tactics, including but not limited to execution, discovery, lateral moving, etc. The heatmap in the GUI 350 can be used to help security analysts and other relevant users understand what phases of attack they should spend time researching or further analyzing to ensure that detection (e.g., detection rules) is defined and put in place.

The heatmap of the GUI 350 may be color-coded and/or may have numeric values assigned to the intelligence presented therein. The color-coding and numeric values can be the same as or similar to the color-coding and numeric values of FIG. 3C. Accordingly, refer to FIG. 3C for further discussion about the color-coding and numeric values associated with the heatmap.

Figure 4A:
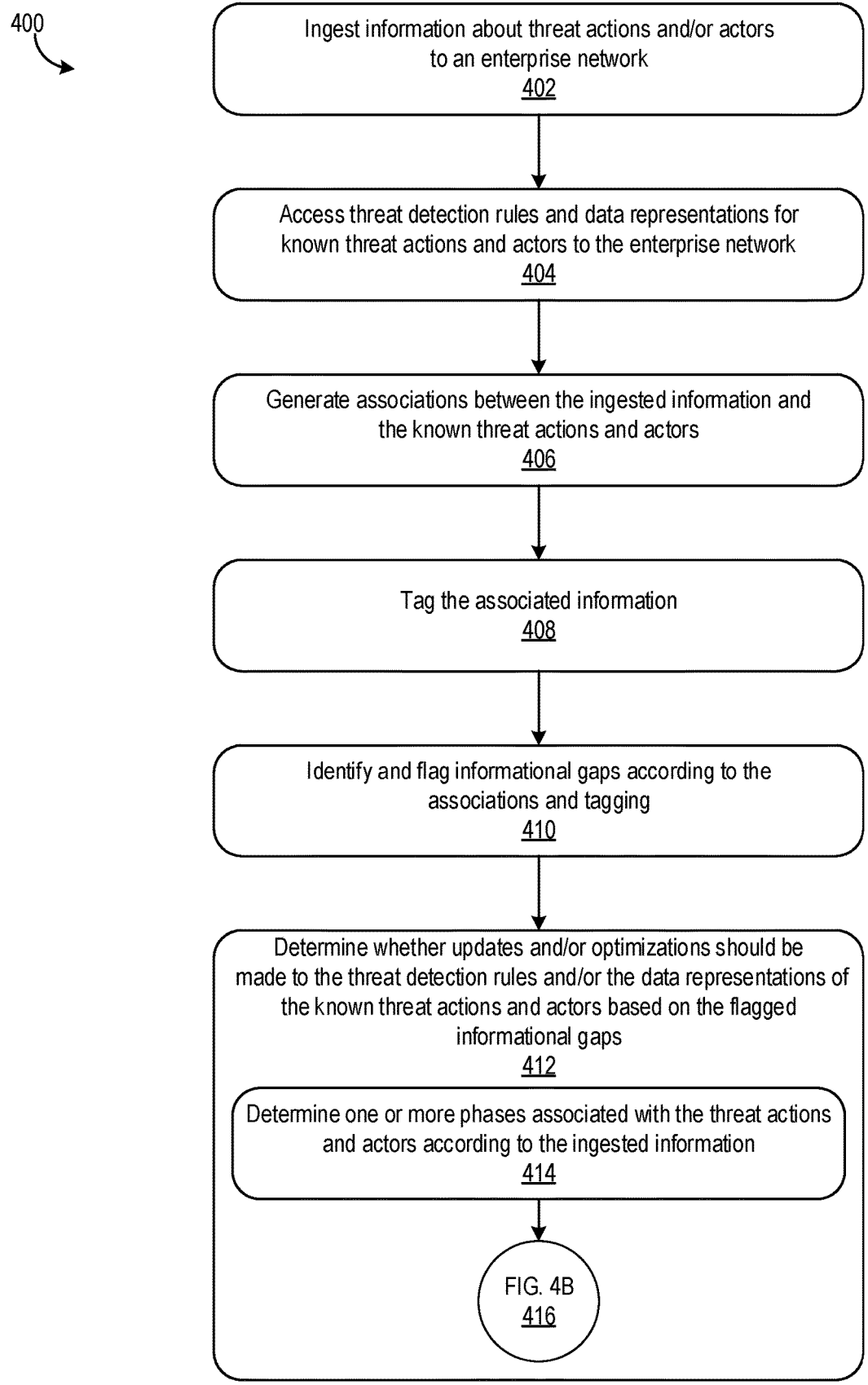
FIGS. 4A, 4B, and 4C are a flowchart of a process for monitoring threat actions and actors and evaluating enterprise threat intelligence responses to those threat actions and actors.
Figure 4B:
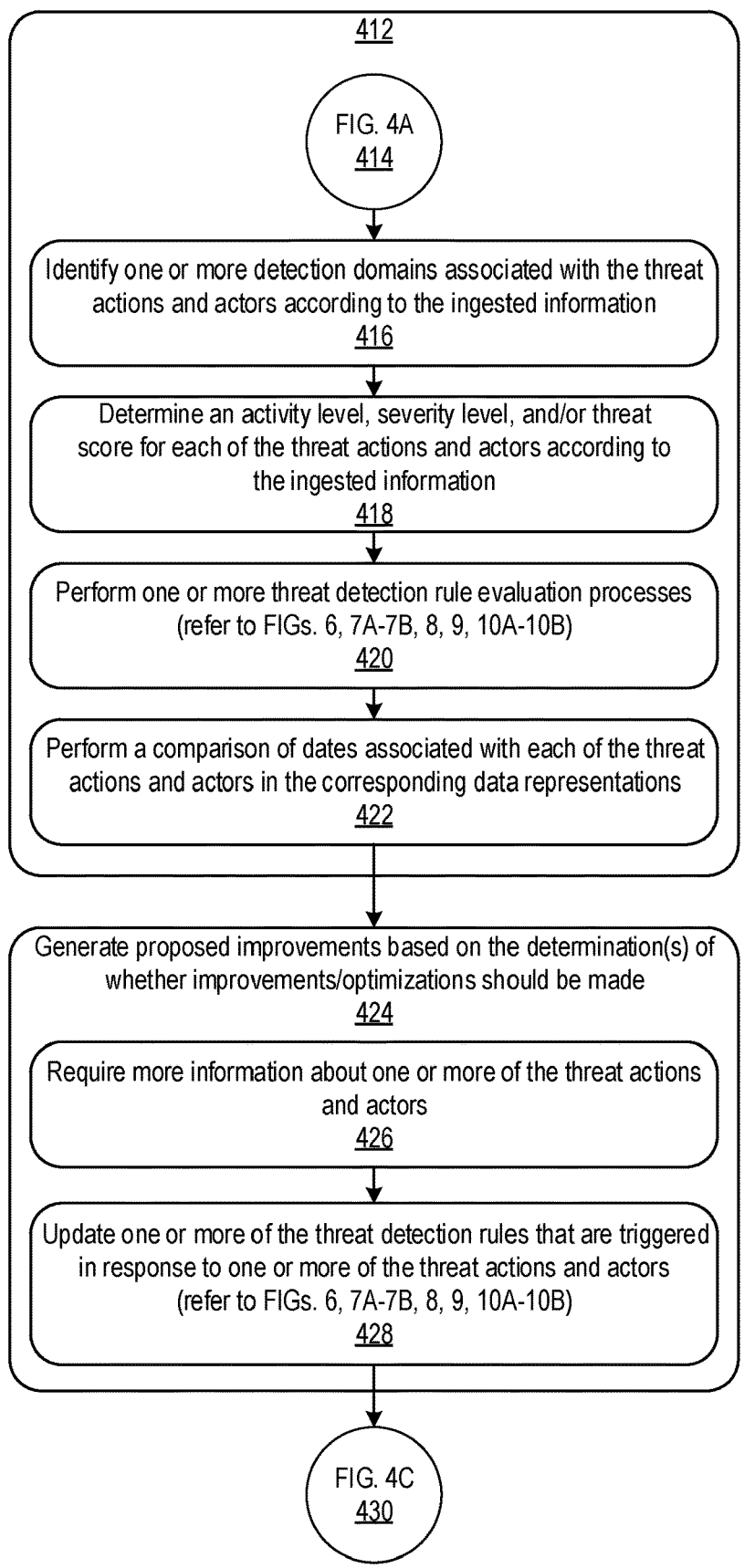
Figure 4C:
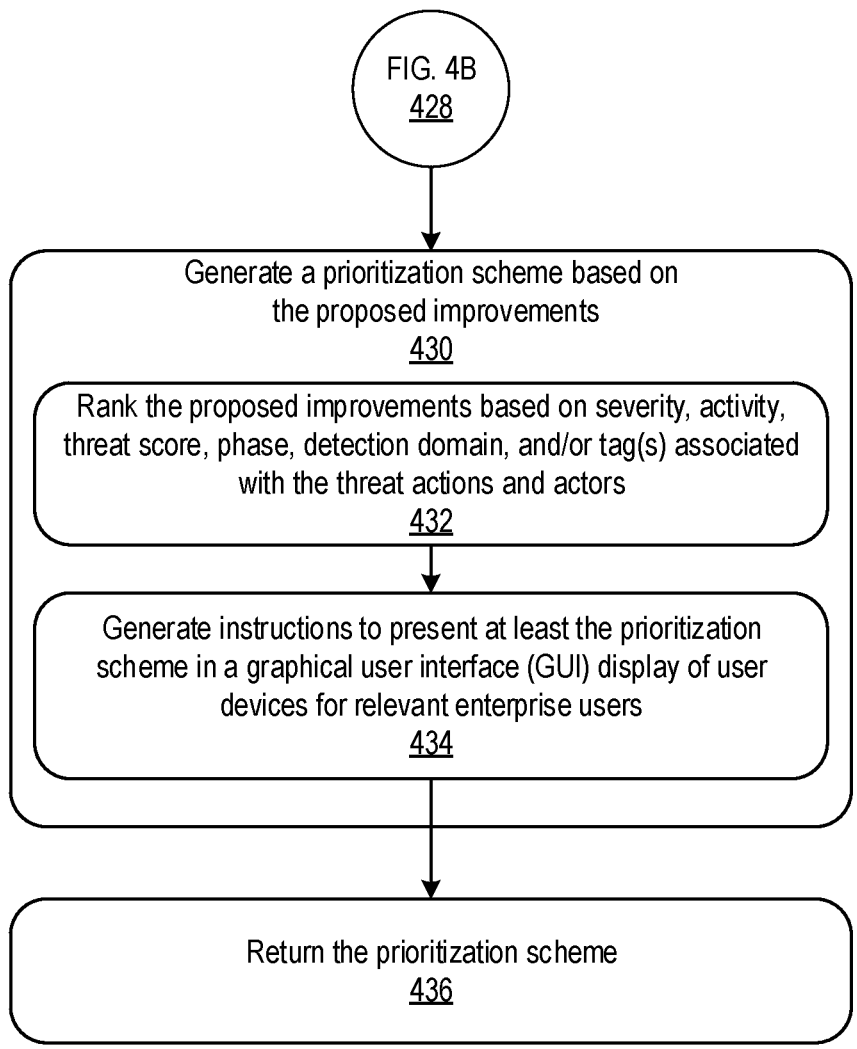

FIGS. 4A, 4B, and 4C are a flowchart of a process 400 for monitoring threat actions and actors and evaluating enterprise threat intelligence responses to those threat actions and actors. Malware instances and threat actors may evolve over time. The process 400 may be used to stay current within an enterprise on identifying these instances, threat actions, and threat actors, as well as identifying effectiveness of threat detection rules, identifying whether appropriate measures are in place to respond to the threat actions/actors, and creating or modifying rules and responses to remain current with ever-evolving threat actions/actors to the enterprise.

The process 400 can be performed by the threat intelligence computer system 102. The process 400 can also be performed by one or more other computing systems, devices, computers, networks, cloud-based systems, and/or cloud-based services. For illustrative purposes, the process 400 is described from the perspective of a computer system.

Referring to the process 400 in FIGS. 4A, 4B, and 4C, the computer system may ingest information about threat actions and/or actors to an enterprise network in block 402. The information can be received from third party systems and/or computing systems/devices in an internal network infrastructure of the enterprise. Refer to at least FIG. 1B for further discussion. The ingested information may include any new documentation about a threat action/actor, which may indicate how the threat action/actor changes over one or more days or other time periods, what actions an actor takes and how those change based on the actor's type of approach/tactics. The ingested information can include automatically generated reports, data packages, and other data documenting threat actions/actors, including but not limited to attempts to attack the enterprise network, dates of when actions/actors are identified, responses to the actions/actors, etc. Any other types of intelligence information about threats to the enterprise may be ingested by the computer system in block 402, as the information is generated and/or at predetermined times (e.g., hourly, daily, weekly, monthly, bimonthly).

The computer system can also access threat detection rules and data representations for known threat actions and actors to the enterprise network in block 404. The data representations may include matrices and other types of data entries and/or tables or file packages including all information (e.g., intel, threat intelligence information) that has been collected and/or documented for each known threat action and actor.

In block 406, the computer system may generate associations between the ingested information and the known threat actions and actors. The computer system may stitch and/or combine information together, identify relationships amongst malicious actors/malicious attack types/domains, and tie those associations together into existing infrastructure of the enterprise network. For example, the computer system may associate information based on mapping threat groups and actors in the ingested information to malicious attacks and/or actions having same identifiers. The mapped information can also be associated with existing threat detection rules, such as YARA rules that are configured to fire to detect different threat actors. The associated information may be further assessed by the computer system to determine how recently the relevant rules were updated and/or whether rules exist to address the particular threat attacks, actions, and/or actors.

The computer system may tag the associated information in block 408. Sometimes, tagging may additionally or alternatively be performed by relevant users in the enterprise, such as security analysts. The tagging can be performed to associate the ingested information with the known threat actions, actors, and/or threat detection rules of the enterprise. Tagged information can be provided to relevant users or groups of users in the enterprise. For example, some malware actions can be tagged to a particular threat actor. All information relating to those malware actions can then be returned/transmitted to a particular cyber group that develops rules and responses to the particular threat actor. Tagging may also be performed to differentiate groups that are analyzed using the disclosed techniques, including but not limited to threat actors/entities, malware, vulnerabilities, and/or tactics, rather than simply identifying a broad category that the particular information fits into. Derived tags may be used to indicate a group and/or topical tag that allows threat entities to be related to one another across the intelligence platform described herein. Data/information that is tagged with a particular threat actor/entity and/or tactic may associate the threat actor/entity with that particular tactic. Data/information that is tagged with a threat actor/entity and a category/topical tag can associate or otherwise relate the threat actor/entity to the particular category/topical tag. Therefore, relationships can be derived because the threat actor/entity may not be tagged directly—the threat actor/entity may be tagged via the data/information as a middle layer that defines how such relationships are inherited. This tagging structure may also make the relationships dynamic; a threat actor/entity may be tagged with a particular tactic, until a name of that tactic changes, or the data/information is updated to remove the particular tactic (in which case the particular tactic would also be removed from the threat actor/entity). The tagging structure also may impact priority of the data/information. As the data/information is updated and the priority changes, detection rules that are derived from the data/information may be assigned respective priority levels that can be updated and reflected to show an original intelligence priority level.

The tagging structure described herein can provide for tagging vulnerabilities and malware in or known to the enterprise. The tagging structure may also be used to tag detection rules with threat actors and further tagging of the rules down to a byte level. Multiple threat actors can be tagged with one threat tactic, as an illustrative example. As another example, each time that a particular attack tactic is performed by any threat actor, that instance can be tagged with one or more corresponding threat detection rules, threat actors, tactics, or other identifiers. The tagging may be used to visualize how a tactic was performed over time by different threat actors, to differentiate how different actors perform the same tactic, and to identify best responses to each threat actor and/or execution of the tactic.

Tagging may provide additional uses. The tagging can permit for correlating threat actors with each other, with particular threat tactics, techniques, and/or procedures, and/or threat detection rules. In GUI displays at relevant user's computing devices, a user can filter threat actors, actions, instances, etc. using the tags. Similarly, the tagging can provide a visualization of workflow for threat intelligence in the enterprise. The tagging may be used to track and manage different intelligence trails by correlating and bringing together all intelligence/information that has been identified for particular threat actors, actions, attacks, rules, etc.

In block 410, the computer system may identify and flag informational gaps according to the associations and tagging. Sometimes, the computer system can perform a variety of techniques, as described in reference to blocks 414-422 below, to determine whether there are informational gaps, and whether to update and/or optimize the threat detection rules and/or optimizations based on the informational gaps (block 412). An informational gap can indicate that more information may be needed about a particular threat actor to be able to generate robust threat detection rules and responses to that actor. As another example, an informational gap can indicate that one or more threat detection rules are outdated and ought to be updated to respond to ever-changing attacks, tactics, techniques, and/or procedures of threat actors. An informational gap can sometimes be identified if the ingested information indicates a new threat actor or action(s) unknown/undocumented by the enterprise. An information gap can sometimes be identified if the ingested information indicates a known threat actor or action(s) to the enterprise but that no rule was triggered in response to the a recent instance of the threat actor/action(s).

In block 412, the computer system may determine whether updates, improvements, and/or optimizations should be made to the threat detection rules and/or the data representations of the known threat actions and actors based on the flagged informational gaps. For example, the computer system may determine one or more phases associated with the threat actions and actors according to the ingested information (block 414). Refer to at least FIG. 2 for further discussion about the various potential phases of attack. For instance, a known threat actor may historically infiltrate the enterprise network during a first phase. The ingested information may indicate that the known threat actor has not infiltrated the enterprise network during a second phase of attack. This may indicate that more intelligence/information is known regarding the first phase of attack versus the second phase of attack. The absence of sufficient information regarding the second phase of attack can showcase an informational gap for improvement in the disclosed intelligence platform. The computer system may determine that although the actor's attack during the second phase is associated with the threat actor, no rules triggered and/or no rules exist to respond to this actor's second phase attack. Therefore, the computer system can determine that this results in an informational gap about the tactics, techniques, and procedures of the threat actor, and thus is an opportunity ripe for improving the enterprise's existing responses to the threat actor.

The computer system can identify one or more detection domains associated with the threat actions and actors according to the ingested information (block 416). Refer to at least FIGS. 1B and 2 for further discussion about the detection domains. The detection domains may indicate whether particular tactics of an attack are performed internally or externally to the enterprise's network. This information, in combination with the other ingested information and the data representations may indicate whether appropriate and up-to-date responses/threat detection rules exist in the enterprise's ecosystem. If, for example, there is information associated with particular tactics that a threat actor/entity takes external to the enterprise network environment but little to no information is ingested about the particular tactics that the threat actor/entity takes once internal to the enterprise network environment, then the computer system can determine that an informational gap exists. The computer system can further determine that the informational gap should be remediated.

The computer system may determine an activity level, severity level, and/or threat score for each of the threat actions and actors according to the ingested information (block 418). Refer to at least FIG. 2 for further discussion. These levels and/or scores can be determined based on processing and aggregating the ingested information and related historic information associated with a particular threat action and/or actor. A higher activity level (which can indicate that a threat actor is increasing complexity in the techniques being performed to infiltrate the network) may warrant updating and/or generating related threat detection rules. A higher severity level may indicate that the threat actor is becoming more insistent about breaking through the enterprise's network and/or the threat actor's actions are having a more severe or grave result on the enterprise's network. Thus, threat detection rules may be improved and/or optimized to counteract the more severe attacks by the threat actor. Similarly, a higher threat score may indicate that the threat actor and/or the threat action pose a greater danger to the enterprise and thus may warrant improvements and/or optimizations of threat response schemes and/or rules.

The computer system may perform one or more threat detection rule evaluation processes in block 420. Refer to FIGS. 6, 7A, 7B, 8, 9, 10A, and/or 10B for further discussion about evaluating the threat detection rules. Any of these rule evaluation processes may be performed to determine whether the rules should be improved and/or optimized. Any of these rule evaluation processes may be performed to determine how to improve and/or optimize the rules. In some implementations, any of these rule evaluation processes can be performed as part of improving and/or optimizing the rules.

The computer system can also perform a comparison of dates associated with each of the threat actions and actors in the corresponding data representations (block 422). Recency of threat actions may be reason to prioritize improving and/or optimizing threat responses and rules related to those more recent threat actions. Age of developed and/or updated rules and responses may additionally or alternatively be a reason to prioritize improving and/or optimizing those rules and responses. For example, the computer system may check how long a particular rule has been in place and whether it is still valid (e.g., firing correctly in response to intended threat actors/actions and/or in response to ever-changing/new threat actors/actions). As another example, the computer system may check when last the particular rules was updated and/or modified. The computer system can analyze data indicating when a threat action/actor was first identified by the enterprise, when last the action/actor was identified, when a threat detection rule was last used, whether the threat detection rule is currently used, etc., any of which may be used by the computer system to determine whether to update and/or optimize threat detection rules for the enterprise.

The computer system can perform any one or more of the blocks 414-422 to determine whether updates and/or optimizations should be made to the threat detection rules and/or the data representations of the known threat actions and actors. Sometimes, the computer system can perform less than all the blocks 414-422. Sometimes, the computer system can perform multiple of the blocks 414-422 in different orders and/or simultaneously.

In block 424, the computer system can generate proposed improvements based on the determination(s) of whether the improvements and/or optimizations should be made. The computer system may generate a list of all improvements and/or optimizations to be made. In some implementations, the computer system may generate a list of a subset of the improvements and/or optimizations to be made.

As part of generating the proposed improvements, the computer system may require more information about one or more of the threat actions and actors in block 426. The computer system can generate an alert or notification, which can be provided to one or more relevant users at their respective computing devices. The request for information can indicate what type of information may be required to further flesh out an intelligence package or other data representation associated with the threat action/actor. The request for information can indicate a request for any other type of information that may be used to fill the identified and flagged informational gap.

As another example, the computer system may update one or more of the threat detection rules that triggered in response to one or more of the threat actions and actors (block 428). Sometimes, the rule updates may be made automatically by the computer system. Sometimes, the rules may be updated manually by one or more relevant users, such as security analysts in the enterprise. For example, the computer system may generate a notification indicating that the rule(s) should be updated, which can then be transmitted to and presented at the relevant user(s)'s computing device(s). Refer to FIGS. 6, 7A, 7B, 8, 9, 10A, and 10B for further discussion about updating the rules.

In block 430, the computer system may generate a prioritization scheme based on the proposed improvements. For example, the computer system may rank the proposed improvements based on severity, complexity, threat score, phase, detection domain, and/or tag(s) associated with the threat actions and actors (block 432). In some implementations, the relevant user may provide user input (e.g., at their respective computing device) indicating a particular tag or other filtering criteria for which to view tasks for improving and/or optimizing responses and rules in the enterprise. The user input may be used by the computer system to generate the prioritization scheme. As another example, the computer system may generate instructions to present at least the prioritization scheme in a graphical user interface (GUI) display of user devices for relevant enterprise users (block 434).

The computer system may consider one or more factors when generating the prioritization scheme. For example, the computer system can determine how well the enterprise's system is set up to detect the threat actions/actors. The more equipped to detect a threat, the less the particular threat may be prioritized than the less equipped the system is to detect the threat(s). The computer system may also consider how much of the network has been exploited (the more the network is exploited, the higher prioritization). The computer system may consider how mature the rules are against a threat and how prepared the enterprise is to detect the threat (the less mature/prepared, the higher prioritization). The computer system may consider how effective a security framework of the enterprise is to empower operations against a threat (less effective, the higher prioritization). The computer system may consider whether the enterprise has sufficient amounts of intelligence to compose effective rules (the less intelligence, the higher prioritization). The computer system may consider if the enterprise has the intelligence, then have they composed effective rules (an absence of rules, the higher prioritization). The computer system can consider how many threats may be detected/visible using the existing framework (the fewer detections/less visibility, the higher prioritization). Any one or more additional or other factors may be considered in determining the prioritization scheme. In some implementations, the computer system can consider whether a threat detection rule is not performing well and/or whether the rule has not been tested, validated, and/or updated in over a predetermined period of time (e.g., the older the rule the higher prioritization, the worse the rule is performing the higher prioritization, the less frequent or recent testing the higher prioritization).

The computer system can return the prioritization scheme in block 436. Returning the scheme can include generating GUI output presenting information about one or more threats actions/actors, detection(s) and/or response(s) in place, a mapping showing where there may be informational gaps, etc. Refer to at least FIGS. 3A, 3B, and 3B (cont) for further discussion.

Figure 5:
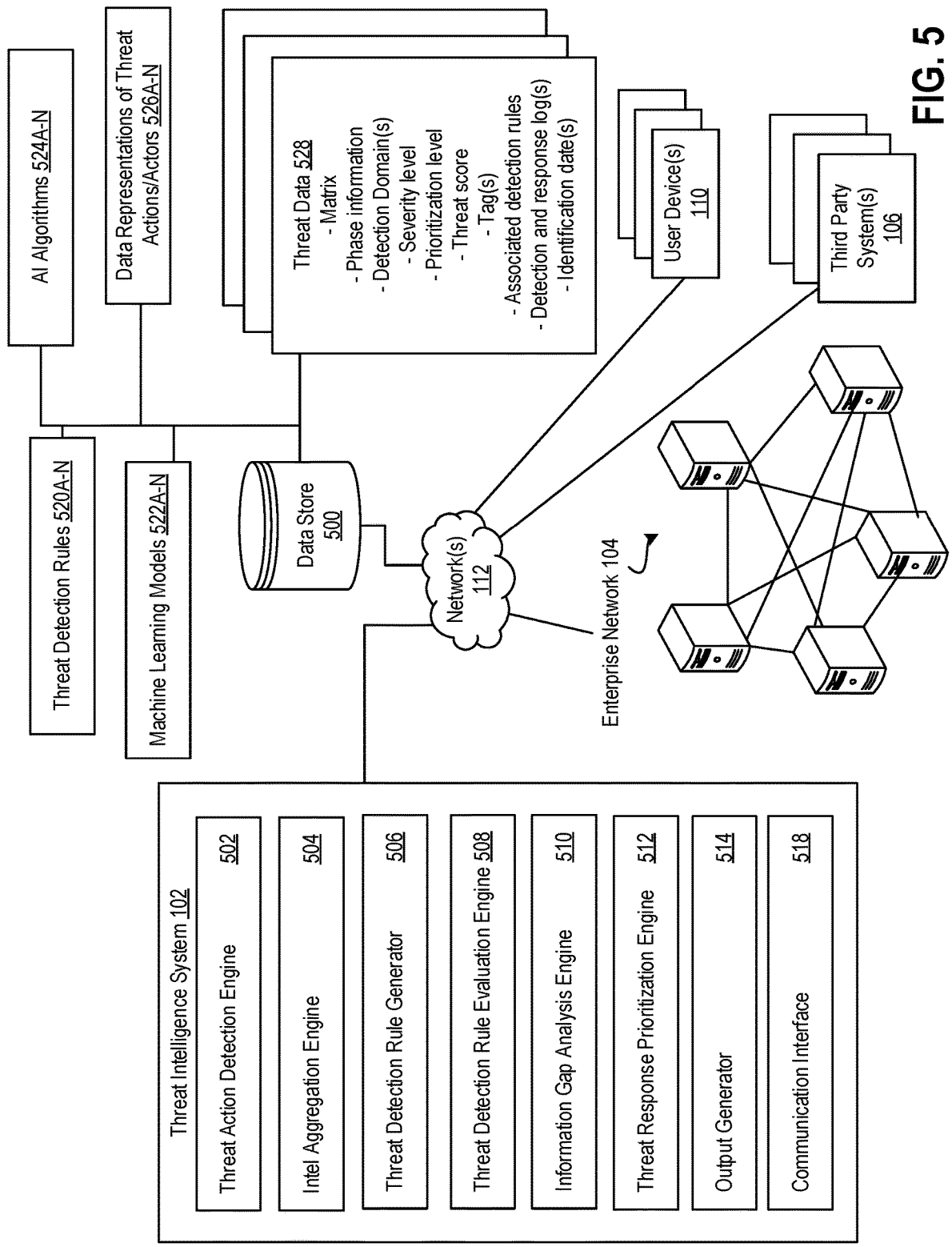
FIG. 5 is a system diagram of components that can be used to perform the disclosed techniques.

FIG. 5 is a system diagram of components that can be used to perform the disclosed techniques. One or more additional or other components that can be used to perform the disclosed techniques are described in reference to FIG. 1A. In FIG. 5, the threat intelligence system 102 can communicate with the enterprise network 104, the user device(s) 110, the third party system(s) 106, and a data store 500 via the network(s) 112. The system 102, the enterprise network 104, the user device(s) 110, and/or the third party system(s) 106 can comprise any type of computing system, computer, computing device, cloud-based computing system, and/or network of computing devices/systems. Sometimes, one or more of the components 102, 104, 106, and 110 may be part of a same network and/or computing system. One or more of the user device(s) 110 can, for example, be part of the enterprise network 104. The enterprise network 104 and the threat intelligence system 102 can be part of a network associated with a particular enterprise, as described herein. The data store 500 can comprise multiple data stores, data repositories, databases, and/or cloud-based storage systems. For example, the data store 500 may include the rules data store 108 described in reference to at least FIGS. 1A and 1B. In some implementations, the rules data store 108 can be separate from the data store 500. In some implementations, the data store 500 may include any of the data stores described in reference to FIG. 1A.

The threat intelligence system 102 can include a threat action detection engine 502, an intel aggregation engine 504, a threat detection rule generator 506, a threat detection rule evaluation engine 508, an information gap analysis engine 510, a threat response prioritization engine 512, and output generator 514, a rule evaluation engine 516, and a communication interface 518. The communication interface 518 may be configured to provide communication (wired, wireless) between components of the threat intelligence system 102 and/or other components described in reference to FIG. 5.

The threat action detection engine 502 can be configured to apply one or more threat detection rules 520A-N stored and accessible via the data store 500 to detect if and when threat actions/actors attempt to and/or infiltrate the internal network 104 of the enterprise. The engine 502 can implement a variety of security practices for the enterprise to ensure the enterprise's network 104 remains secure from attacks, whether internal or external attacks. In some implementations, the threat action detection engine 502 can be part of a different system/device, such as the network security system 156 of FIG. 1A.

The intel aggregation engine 504 can be configured to process, combine, aggregate, and/or stitch together various information that is received from the enterprise network 104 and/or the third party system(s) 106. The engine 504 may use one or more machine learning models 522A-N and/or AI algorithms 524A-N to determine how to associate the information. The engine 504 can aggregate and associate the information into data representations of threat actions/actors 526A-N, which may then be stored in and accessible via the data store 500. The engine 504 may also aggregate and associate the information into threat data 528. The threat data 528 may include a matrix representative of the associations between different information for a particular threat action/actor, phase information, detection domain(s), severity level, prioritization level, threat score, tag(s), associated detection rules, detection and response log(s), and/or identification date(s). In some implementations, one or more of the threat data 528 may be generated and/or updated by relevant users (e.g., security analysts) at the user device(s) 110. The users can provide user input at the user device(s) 110, which can be transmitted to the data store 500 for storage in association with a particular data representation 526A-N and/or particular threat data 528. The threat data 528 may be similar to or the same as intel packages described herein. Refer to at least blocks 402-408 in the process 400 of FIGS. 4A, 4B, and 4C for further discussion.

The threat detection rule generator 506 can be configured to generate one or more threat detection rules using one or more machine learning models 522A-N and/or AI algorithms 524A-N. The generator 506 may leverage other data, such as the threat data 528 and the data representations 526A-N to generate appropriate threat detection rules. Sometimes, the users at the user device(s) 110 may also generate the threat detection rules 520A-N and/or provide inputs to the generator 506 to generate the threat detection rules 520A-N. In some implementations, the generator 506 may also be configured to update the existing rules 520A-N, based on user input from the user device(s) 110 and/or instructions, tasks, and/or prioritization information from the threat detection rule evaluation engine 508, the information gap analysis engine 510, and/or the threat response prioritization engine 512. Any of the updates to the existing rules 520A-N may be performed using the machine learning models 522A-N and/or the AI algorithms 524A-N. In some implementations, the generator 506 can be part of a different system, such as the network security system 156 of FIG. 1A.

The threat detection rule evaluation engine 508 can be configured to perform one or more rule evaluation processes described herein. For example, the engine 508 can perform rule evaluations iteratively, continuously, at predetermined time intervals, and/or whenever user input is received to perform a rule evaluation. The rule evaluations may be performed to determine whether the threat detection rules 520A-N are firing correctly, responding to known, adapted, and/or new threats, being used, outdated, not responding to new variations of a threat action/actor, etc. The engine 508 may generate one or more suggested improvements and/or tasks for updating, modifying, or otherwise improving one or more of the tested rules 520A-N. Refer to FIGS. 6, 7A, 7B, 8, 9, 10A, and 10B for further discussion about evaluating and testing the threat detection rules 520A-N.

The information gap analysis engine 510 can be configured to assess the threat data 528 and/or the data representations 526A-N to determine whether there may be missing or outdated information (e.g., intel, intelligence) for one or more threat actions/actors. The engine 510 can also determine whether the threat detection rules 520A-N have been generated and/or updated based on outdated threat data 528 for the known actions/actors, or whether the threat detection rules 520A-N ought to be updated. In some implementations, the engine 510 may determine whether threat data is missing altogether for a new, unknown threat actor/action to the enterprise network 104, the new, unknown threat actor/action being identified by the threat action detection engine 502. The engine 510 may also generate one or more tasks and/or suggestions for updating or otherwise filling in/fleshing out determined information gaps. Refer to at least blocks 410-428 in the process 400 of FIGS. 4A, 4B, and 4C for further discussion.

The threat response prioritization engine 512 can be configured to determine a prioritization scheme for updating the threat detection rules 520A-N, the threat data 528, and/or the data representations 526A-N. The engine 512 may, in some implementations, generate and/or suggest tasks to be performed, automatically by one or more of the components described herein and/or the users at the user device(s) 110. Sometimes, the engine 512 may receive the tasks and/or suggested improvements from the other engines described above and then apply one or more prioritization rules and/or criteria to determine how to prioritize those tasks and suggested improvements. Refer to at least blocks 430-434 in the process 400 of FIGS. 4A, 4B, and 4C for further discussion.

The output generator 514 can be configured to receive the prioritization scheme from the threat response prioritization engine 512 and generate output indicating that scheme and related tasks and suggested improvements. The generator 514 can generate instructions for presenting the output in GUI displays at the user device(s) 110. The generator 514 may also generate output for presenting other relevant information about the detected threats from the threat detection engine 502, the aggregated information from the intel aggregation engine 504, the rule triggering, performance, and/or evaluation information from the threat detection rule generator 506 and/or the threat detection rule evaluation engine 508, and/or the informational gap analysis information from the information gap analysis engine 510. The generator 514 may generate output for presenting any other information described herein for analysis, review, and/or action by relevant users (e.g., security analysts) to the enterprise, including but not limited to the threat data 528 and the data representations 526A-N. Refer to at least the block 436 in the process 400 of FIGS. 4A, 4B, and 4C, and FIGS. 2, 3A, 3B, and 3B (cont) for further discussion.

Figure 6:
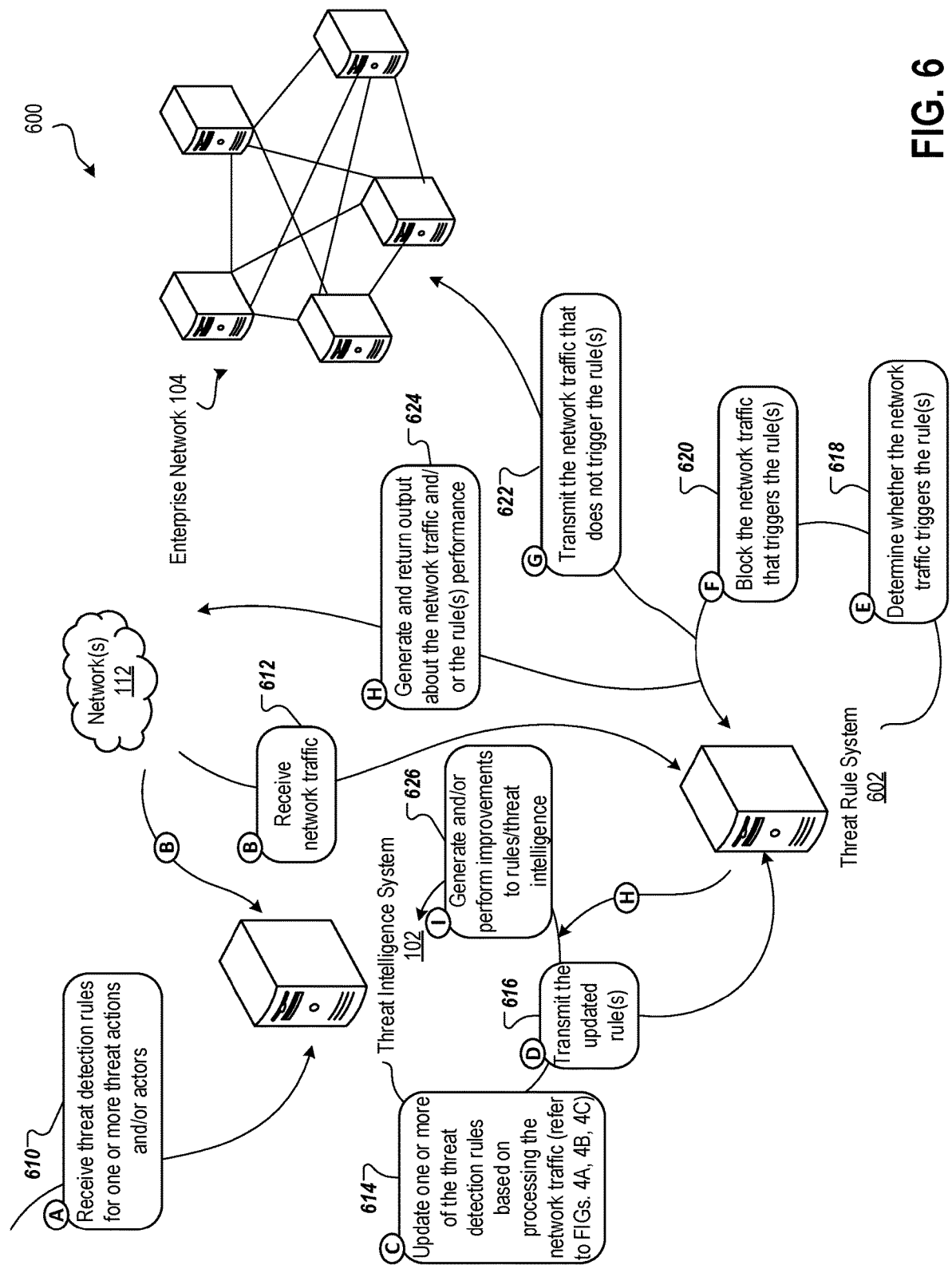
FIG. 6 is a conceptual diagram of a system for testing and evaluating threat detection rule performance.

FIG. 6 is a conceptual diagram of a system 600 for testing and evaluating threat detection rule performance. The system 600 can be implemented during runtime to determine effectiveness of rule execution in response to threat actions/actors of the enterprise's internal network 104. The system 600 may include the threat intelligence system 102, the enterprise network 104, and a threat rule system 602 communicating (wired, wirelessly) via the network(s) 112. The threat rule system 602 can be any type of computing system, device, and/or network of computers or devices that is configured to detect malware, threats, and other malicious files that attempt to infiltrate the enterprise network 104. As shown in FIG. 6, the threat rule system 602 may sit on an edge of the enterprise network 104 and monitor network traffic or other files before they enter the enterprise network 104. The threat rule system 602 can implement one or more threat detection rules described herein to detect and stop malware and other threats before they infiltrate the enterprise network 104. Sometimes, the threat rule system 602 can be part of the threat intelligence system 102. For example, the threat rule system 602 may be the threat action detection engine 502 of the threat intelligence system 102, which is described in FIG. 5. In the illustrative example of FIG. 6, the threat rule system 602 is separate from the threat intelligence system 102.

The threat intelligence system 102 can receive threat detection rules for one or more threat actions and/or actors (block A, 610). Sometimes, the system 102 may receive one or more malware dictionaries for one or more malware families. This information can be received from third party systems, enterprise network devices, and/or data stores, as described in reference to at least FIGS. 1A, 1B, and 5.

The threat intelligence system 102 may also receive network traffic in block B (612).

The threat intelligence system 102 can update one or more of the threat detection rules based on processing the network traffic and any other information received in block A, such as the malware dictionaries of known malware families to the enterprise (block C, 614). Refer to FIGS. 4A, 4B, and 4C for additional discussion about processing the information and evaluating the rules. As another illustrative example, the threat intelligence system 102 may update one or more of the threat detection rules for a malware family that corresponds to a received malware dictionary. Optionally, the threat rule system 602 may be configured to perform the rule updates instead of the threat intelligence system 102. In some implementations, in addition to or instead of updating the rules by the threat intelligence system 102 and/or the threat rule system 602, one or more new threat detection rules can be determined using signature sequences in the received dictionary and/or other information identifiable from the received network traffic.

The rules that are updated and/or generated in block C (614) may include YARA rules. YARA rules, for example, can define a number of conditions or variables that contain patterns in a sample of malware or other threat. If some or all of the conditions or variables are met, then depending on the particular rule, malware can be detected and/or identified in network traffic or other files before the network traffic/files enters the enterprise network 104. One or more other types of threat rules may also be updated and/or generated. Each of the rules can define different triggering conditions. The rules can also define different actions to be taken (e.g., automatically by the threat rule system 602 or the threat intelligence system 102, manually by a relevant user in the enterprise network 104) in response to being triggered. Sometimes, updating existing rules can include adding one or more signatures or signature sequences from the received dictionary or assessed network traffic to a trigger condition in the rules. For example, a rule for detecting malware in a family A can be triggered if network traffic or another file contains signatures $s25 and/or $s29. The threat intelligence system 102 and/or the threat rule system 602 can update this rule so that the rule is triggered if network traffic now contains signatures $s25, $s29, $s0, $s0', and/or $s4'. This update can be determined by the threat intelligence system 102 based on processing the network traffic and/or other received information and determining that the rule is outdated or otherwise not triggering in response to new variations of the particular malware family A. In some illustrative rules, all signature sequences may be required for the rule to be triggered. In some illustrative rules, a subset or minimum threshold quantity of signature sequences may be required for the rule to be triggered. In yet some rules, at least one of the signature sequences may be required for the rule to be triggered. Various other updates can also be made to the rules so that the rules efficiently and accurately identify malware and variations of malware that may attempt to infiltrate the enterprise network 104 over time.

The updated and/or generated rule(s) can be transmitted from the threat intelligence system 102 to the threat rule system 602 in block D (616). In some implementations in which the rules are updated and/or generated at the threat rule system 602, block D (616) may not be performed. Rather, the threat rule system 602 can retrieve the rules, such as from a data store described herein, optionally update the retrieved rules, and/or perform the rules during runtime execution.

The threat rule system 602 can also receive network traffic or other types of files in block B (612). The network traffic can be received from the network(s) 112 before, during, or after any of the other blocks described herein. The network traffic can include files of information, data, and/or files that are being routed to the network 104 of the enterprise. Before the network traffic enters the enterprise network 104, the network traffic may pass through a security wall, which can be the threat rule system 602 (or the threat intelligence system 102, if the threat rule system 602 is part of the threat intelligence system 102).

The threat rule system 602 can determine whether any content in the network traffic triggers one or more of the threat detection rules (including previously defined rules, newly generated rules, and/or updated rules) (block E, 618).

The threat rule system 602 can block any of the network traffic that triggers one or more of the rules (block F, 620). The system 602 may prevent that network traffic from being transmitted into the enterprise network 104. The system 602 may also perform one or more other actions responsive to blocking the network traffic. The other actions can be defined by the rule(s) that is triggered.

The threat rule system 602 may also transmit any of the network traffic that does not trigger one or more of the rules to the enterprise network 104 (or more particularly, a system or device in the enterprise network 104 that the transmitted network traffic is intended to be received by) (block G, 622).

The system 602 can generate and return output about the assessed network traffic and/or rule performance in block H (624). The output can be returned to the threat intelligence system 102, a data store described herein, one or more user devices, and/or any other computing system and/or device in communication via the network(s) 112. The output can indicate how much or what network traffic was blocked, what rules were triggered, and/or how much or what network traffic did not trigger any of the rules. The output may also indicate one or more responses that the threat rule system 602 took when the network traffic triggered one or more rules. In some implementations, the output can indicate one or more particular signatures, signature sequences, and/or malware families that were detected and that triggered one or more of the rules. Various other metrics, data, and information about rule triggering process described herein may be returned in the output.

The threat intelligence system 102 can generate and/or perform improvements to the rules and/or threat intelligence based on the returned output (block I, 626). For example, the returned output may be used by the threat intelligence system 102 to update one or more of the threat detection rules (refer to block C, 614). The returned output may be used by the threat intelligence system 102 to determine one or more suggested improvements and/or tasks for updating the threat detection rules, as described in reference to the process 400 in FIGS. 4A, 4B, and 4C. In some implementations, the returned output may be used by the threat intelligence system 102 to determine one or more informational gaps about the malware families and other threat actors/actions that may be identifiable from the network traffic. The returned output may be used by the threat intelligence system 102 to determine a prioritization scheme for updating the threat detection rules and/or filling in the informational gaps. Refer to the process 400 in FIGS. 4A, 4B, and 4C for further discussion.

Although the disclosed techniques are described with reference to network traffic, the disclosed techniques can also apply to any other type of file.

Figure 7A:
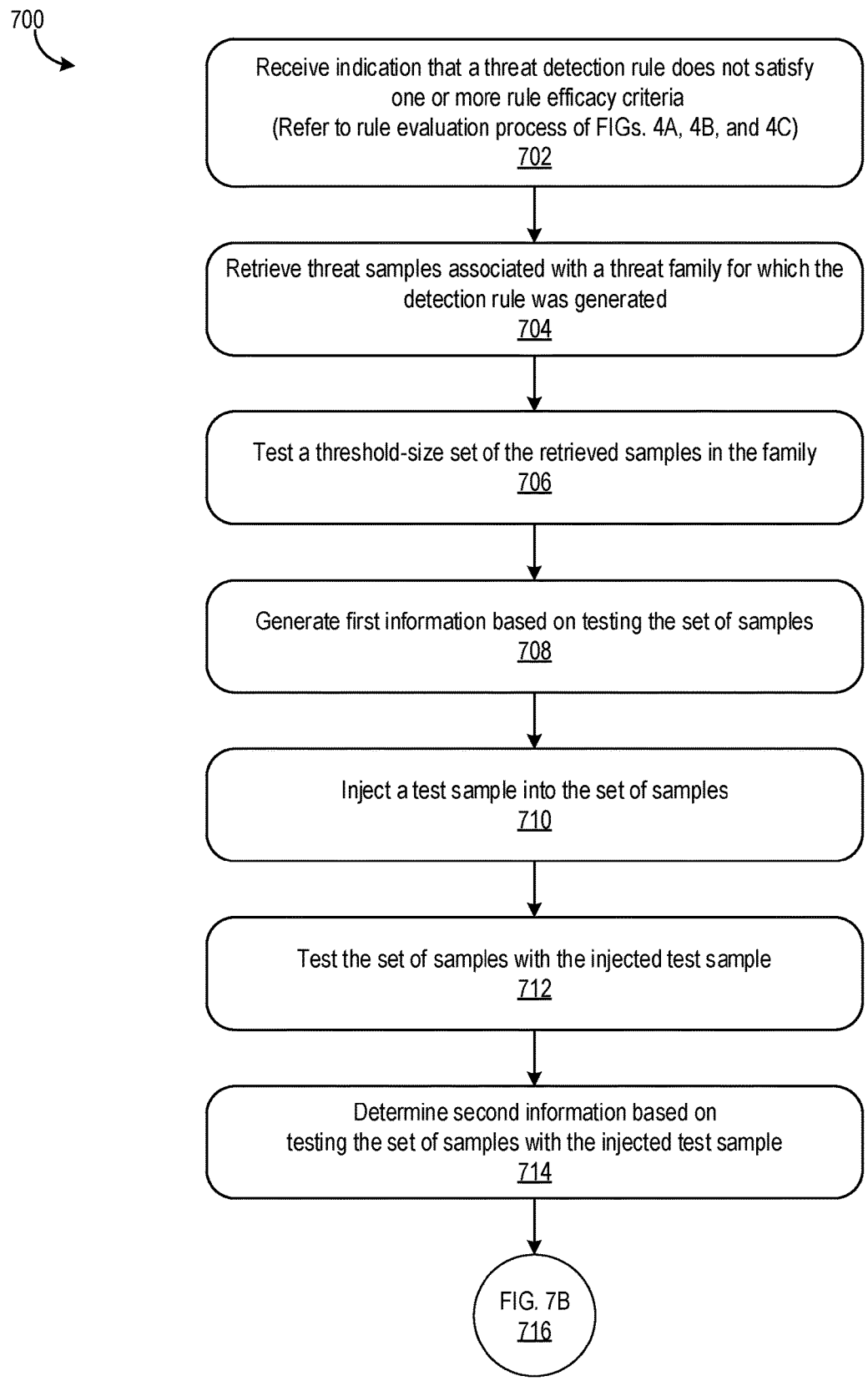
FIGS. 7A and 7B are a flowchart of a process for testing and evaluating threat detection rule performance.
Figure 7B:
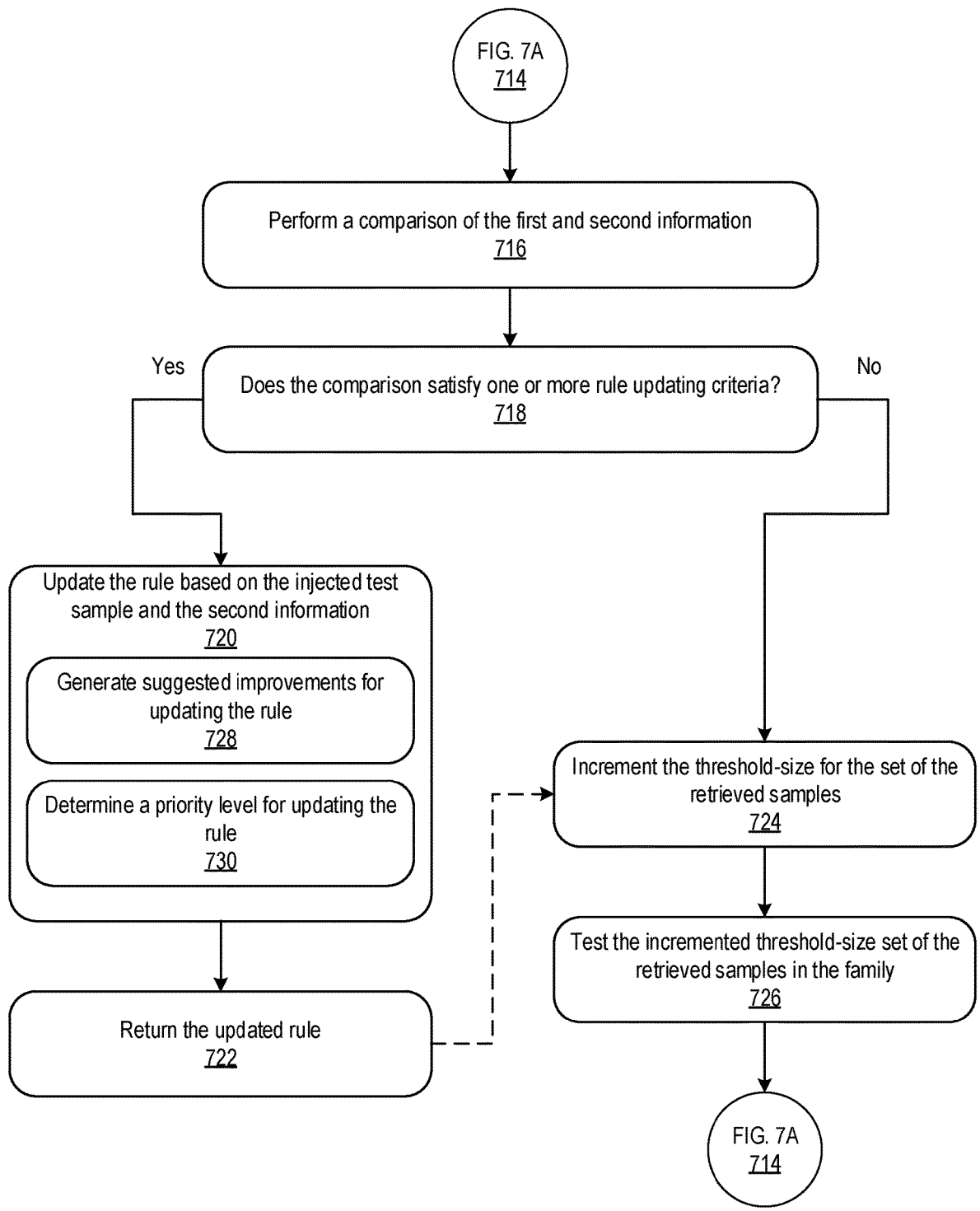

FIGS. 7A and 7B are a flowchart of a process 700 for testing and evaluating threat detection rule performance. For example, the process 700 can be performed for determining whether a malware sample belongs to a particular malware family. The process 700 can be performed in scenarios in which the particular malware family produces at least one threat detection rule that does not perform as expected (e.g., the rule(s) does not detect at least a threshold quantity or type of malware signature sequences for the particular malware family). Sometimes, a relevant user, such as an analyst, may not be able to determine or detect why the malware family produced a rule that does not perform as expected. Thus, the process 700 can be performed with a predetermined-size set of samples in which another sample it iteratively added to the set and then tested to determine what sequences are generated as a result. By adding a single sample at a time to the set, a computer system can more accurately identify which sample may be causing the rule that performs poorly to be generated (such as by assessing a quantity of sequences that are generated after testing the set with the added sample). Once the computer system identifies which sample caused the rule to be generated that does not execute as expected, that sample can be removed from the set of samples for the particular malware family. The resulting set of samples can then be used to update and/or generate one or more malware detection rules for the particular malware family.

The process 700 can be performed by the threat intelligence system 102 described herein. The process 700 may be performed by the threat rule system 602 described in FIG. 6, or any other computing system. For illustrative purposes, the process 700 is described from the perspective of a computer system.

Referring to the process 700 in both FIGS. 7A and 7B, the computer system may receive an indication that a threat detection rule does not satisfy one or more rule efficacy criteria (block 702). The indication can be generated by and/or received from a user device of a relevant user (e.g., the user can provide user input at their device requesting to check or otherwise update a particular malware family), the computer system itself, or any other computer system component described herein. The rule efficacy criteria may not be satisfied if an effectiveness rate of the threat rule is less than a threshold effectiveness level and/or a less than a previous/prior effectiveness rate of the rule. The rule efficacy criteria may not be satisfied if the rule fired/executed less than a threshold amount of times over a predetermined period of time. The rule efficacy criteria may not be satisfied if the rule returns more than a threshold quantity of false positives and/or false negatives. One or more other criteria can also be used to assess the quality of the rule for purposes of performing the process 700.

The indication that is received in block 702 can include, for example, the effectiveness rate of the rule in stopping potentially malicious network traffic in an enterprise's internal network over some predetermined period of time (e.g., a past hour, a past 8 hours, a past day, a past 2 days, a past week, etc.). The indication can indicate that a particular rule or multiple rules have not been firing/executing as expected over the predetermined period of time. The indication can indicate that a particular rule or multiple rules are returning more false positives or more false negatives than an expected or threshold level of false positives/negatives or compared to a quantity of returned false positives/negatives during past or prior rule(s) execution. In some implementations, the indication can indicate an informational gap for the potentially malicious network traffic and/or the particular rule or multiple rules. Refer to the rule evaluation process described further in reference to at least FIGS. 4A, 4B, and 4C.

In some implementations, block 702 may not be performed. Instead, for example, the computer system can perform routine checks or other checks at predetermined time intervals of one or more rules for one or more malware families. As a result, the process 700 can be automatically performed without an indication first being generated and received in block 702.

The computer system can retrieve threat samples associated with a threat family for which the detection rule was generated in block 704. For example, the computer system can retrieve all malware samples associated with a malware family that produced the detection rule that does not satisfy the one or more rule efficacy criteria. The computer system can retrieve a portion of the samples associated with the family. The computer system can retrieve a random portion of the samples. As another example, the computer system can retrieve a subset of the samples associated with the family. The subset can include samples that share similar characteristics, traits, types, or other data/information with the detection rule that did not satisfy the one or more rule efficacy criteria. The subset can include samples that were used to generate the detection rule, in some implementations.

In block 706, the computer system may test a threshold-size set of the retrieved samples in the family. The testing can include simulating generation of sequences in signatures of the family. As an illustrative example, if the set of samples includes 1 malware sample, the computer system can test how many malware sequences the 1 malware sample generates when run with detection rules. The computer system can start with a smallest quantity of samples in the set to test sequence generation of the set. The smallest quantity of samples in the set can be 1 sample, as an illustrative example. As another example, the threshold-size set of the retrieved samples can include 2 samples. One or more other threshold-size sets can also be determined and/or used in block 706. As a result, the computer system can accurately and efficiently identify a particular sample that caused or most likely resulted in the rule not satisfying the one or more rule efficacy criteria.

The computer system may generate first information based on testing the set of samples in block 708. The first information can be an initial count of sequences that are generated based on testing the set of samples. The initial count of sequences can represent a baseline quantity of sequences that are generated for the family. The initial count can then be used and compared to subsequent counts that are generated when samples are added to the set of samples and then tested to determine whether any of the added samples are cause for the detection rule that does not satisfy the one or more rule efficacy criteria.

The computer system can inject a test sample into the set of samples in block 710. The test sample can be a new malware sample that is retrieved from a dictionary of malware samples (e.g., a dictionary of malware samples associated with the particular malware family, a dictionary of malware samples associated with various different malware families, a dictionary of malware samples associated with a sub-family of the particular malware family). For example, the computer system can inject a malware sample that was retrieved in block 704 but that was not included in the threshold-size set of the retrieved samples that was tested in block 706. By injecting the malware sample back into the set for the particular malware family, the computer system can determine whether the injected sample is the sample that was wrongfully associated with the malware family and thus caused the generation and poor performance of the detection rule that does not satisfy the one or more rule efficacy criteria.

In block 712, the computer system can test the set of samples with the injected test sample, similarly as described above in reference to block 706.

The computer system can determine second information based on testing the set of samples with the injected test sample (block 714). The second information can be a second count of sequences that are generated based on testing the set of samples. In other words, the computer system can determine how many signature sequences are generated as a result of the samples in the set (which, as an illustrative example, can include the 1 sample from the threshold-size set that was tested in block 706 and the test sample that was injected in block 710).

The computer system may perform a comparison of the first and second information in block 716. Comparing the information can include determining whether the first and second counts are similar, the same, or different. Comparing the information can include determining a difference between the first and second counts.

In block 718, the computer system can determine whether the comparison satisfies one or more rule updating criteria. The computer system can compare the initial count representing the baseline to the second count. The computer system can determine, for example, whether the second count is the same as or similar to the initial counts. If the counts are the same or similar, the computer system can determine that the injected test sample likely belongs to the family and thus is not the cause of the detection rule that does not satisfy the rule efficacy criteria. If the second count is within a threshold range of the initial count, then the computer system can determine that the injected test sample likely belongs to the family. If the second count is less than a threshold value or less than the initial count by more than a threshold range, the computer system can determine that the injected test sample likely does not belong to the family and thus is a cause of the detection rule not satisfying the rule efficacy criteria. On the other hand, if the second count is greater than a threshold value or greater than the initial count by more than a threshold range, then the computer system may determine that the injected test sample likely belongs to the family.

If the one or more criteria is satisfied (e.g., the injected test sample caused the detection rule to not satisfy the rule efficacy criteria), the computer system can update the rule based on the injected test sample and the second information in block 720. In some implementations, the computer system can generate suggested improvements for updating the rule (block 728), which can then be transmitted to and presented in GUI displays at user devices of relevant users (e.g., security analysts). In some implementations, the computer system can determine a priority level for updating the rule (block 730), which may be based on how much of a gap exists between the first and second counts, when last the rule was updated, etc.

In some implementations, if the criteria is satisfied in block 718, the computer system may add the injected test sample to a dictionary for the family and then the dictionary can be returned and used for updating or generating one or more detection rules.

The computer system can then return the updated rule in block 722. The updated rule can be transmitted to the relevant users' user devices. The updated rule can be stored in a data store described herein. The updated rule can be automatically fed back into the computer system for runtime use and execution.

Optionally, the computer system may stop the process 700 or proceed to block 724, described below, after returning the updated rule.

If the one or more criteria is not satisfied in block 718 (e.g., the injected test sample may not be a cause for the detection rule to not satisfy the rule efficacy criteria), the computer system may increment the threshold-size for the set of retrieved samples in block 724. By incrementing the size of the set of samples that are being tested, the computer system can determine whether any samples added to the set cause the one or more rule updating criteria in block 718 to not be satisfied. The computer system can increment the threshold-size by 1 sample. The threshold-size can be implemented by any one or more other amounts, such as 2 samples, 3 samples, 4 samples, 5 samples, etc., so long as the threshold size is 1 less than a total size of the malware family. As an illustrative example, the computer system can iterate through the process 700 every time that the computer system increments the threshold-size for the set of the retrieved samples by 1 sample. The malware family can have 50 samples. As a result, the computer system can iterate through the process 49 times, which is 1 less than the total quantity of samples of the malware family.

The computer system may then test the incremented threshold-size set of the retrieved samples in the family (block 726). In other words, the computer system can test sequence generation of the set of samples that includes at least one additional sample. The computer system can return to block 614 in the process 600 and repeat blocks 614-626

The computer system continues through the process 700 by returning to block 714 and repeating the blocks 714-726 until the computer system has incremented the threshold-size for the set to a predetermined quantity and/or a maximum threshold. Sometimes, the computer system can continue through the process 700 until (i) the computer system determines that one of the samples that is added to the set of samples causes a count of generated sequences to not satisfy the one or more rule updating criteria and/or (ii) the computer system can no longer increment the threshold-size for the set of retrieved samples (e.g., the computer system has increased the threshold-size to the total size of the malware family less 1 sample).

Figure 8:
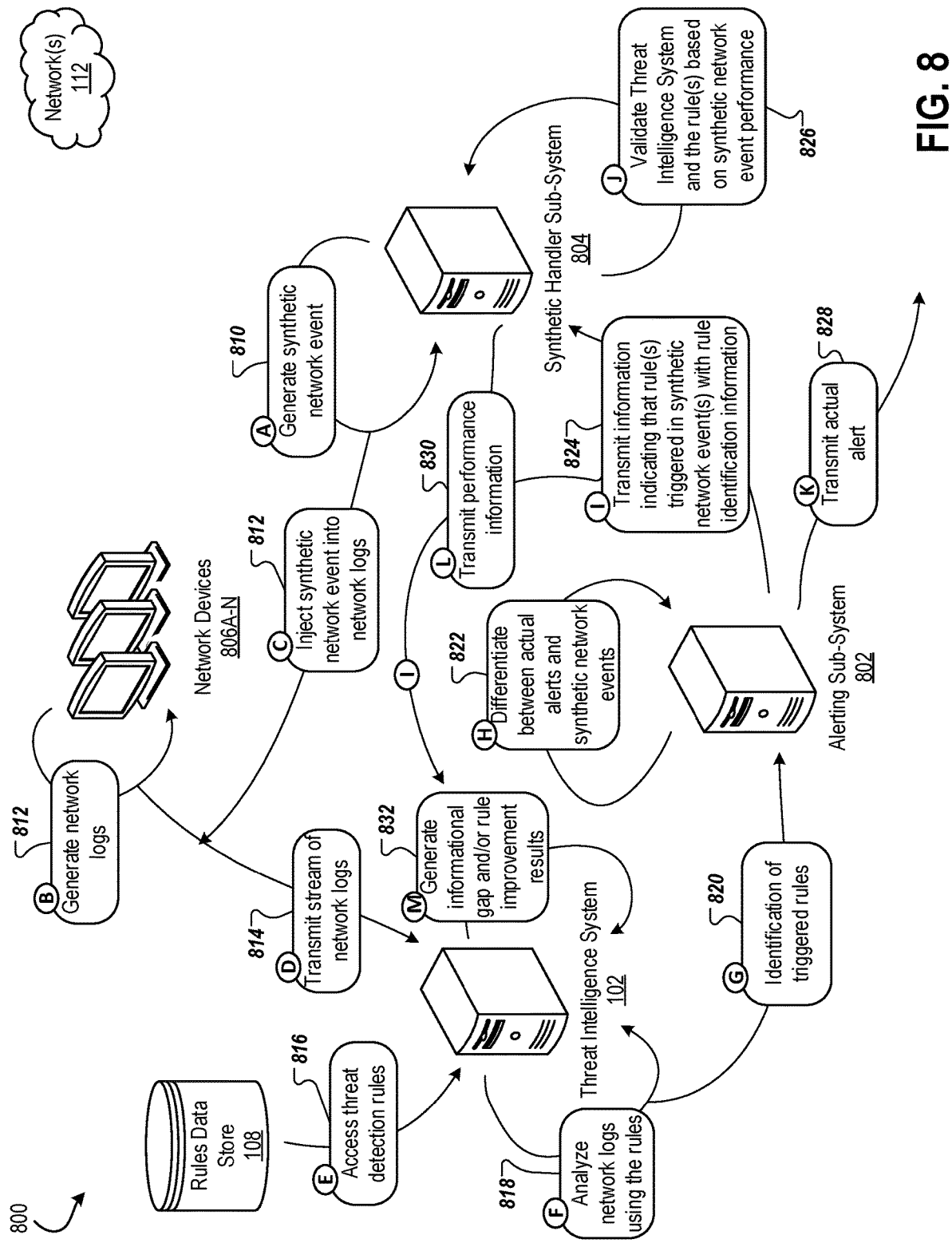
FIG. 8 is a conceptual diagram of a system for evaluating and validating an enterprise's threat intelligence system using synthetic network events.

FIG. 8 is a conceptual diagram of a system 800 for evaluating and validating an enterprise's threat intelligence system using synthetic network events. The system 800 can be used as part of evaluating threat detection rules in the process 400 of FIGS. 4A, 4B, and 4C.

In the system 800, the threat intelligence system 102 can communicate, via the network(s) 112, with the rules data store 108, one or more network devices 806A-N (which can be part of the enterprise's internal network 104 described herein), an alerting sub-system 802, and a synthetic handler sub-system 804. In some implementations, the alerting sub-system 802 and/or the synthetic handler sub-system 804 can be part of the threat intelligence system 102. In some implementations, the alerting sub-system 802 and/or the synthetic handler sub-system 804 can be part of or the same as the threat detection rule evaluation engine 508 described in reference to FIG. 5.

The synthetic handler sub-system 804 can generate at least one synthetic network event in block A (810). The synthetic event can replicate an actual event that can cause triggering of a rules engine in the threat intelligence system 102. Unlike the actual event, the synthetic event can include a tag that the alerting sub-system 802 may use in differentiating the synthetic event from actual events. If the synthetic event does not include the tag, for example, then the synthetic event can cause the alerting sub-system 802 to respond as if the synthetic event is an actual threat event. In some implementations, the synthetic event can be generated by a user, such as a developer and/or security analyst at one of the network devices 806A-N.

The network devices 806A-N can generate network logs (block B, 812). The network logs can be generated at a same time as the synthetic event is generated (block A, 810). In some implementations, the network logs can be generated at a different time than the synthetic event generation. Although the network logs are depicted as being generated after the synthetic events, the network logs can also be generated before the synthetic events.

The synthetic event can be injected into the network logs by the synthetics handler sub-system 804 (block C, 812). As described herein, the synthetic event can be automatically injected at predetermined time intervals (e.g., every 12 hours). The synthetic event can also be additionally or alternatively injected at user-defined time intervals. For example, a user can generate a synthetic event to run only once. The user can inject that synthetic event into the network logs at a time of the user's preference. When the synthetic events are injected into the stream, the synthetic events can be handled or treated like other events in the stream. In other words, the synthetic events may not override or take priority over other operations, events, or activities in the stream. Therefore, the synthetic events can be injected into the stream without impacting network activity at the network devices 806A-N.

In some implementations, more than one synthetic event can be generated at a time and injected into the network logs. More than one synthetic event can also be run at a time to test different components of an alerting pipeline (e.g., different synthetic events can test different rules in a rules engine of the threat intelligence system 102).

The stream of network logs can be transmitted from the network devices 806A-N to the threat intelligence system 102 (block D, 814). The stream of network logs can be transmitted once the synthetic event is injected therein. In other implementations, the synthetic events can be injected into the stream of network logs as the stream is transmitted to the threat intelligence system 102.

Once the threat intelligence system 102 receives the network logs, the system 102 can access rules (e.g., detection signatures) from the rules data store 108 (block E, 816). Which rules are used for threat detection can be determined based on settings that are configured by the users, such as detection authors and/or security analysts. The users can set rules as active or inactive, and as test or "live." The system 102 can access rules specific to the stream of network logs. The system 102 can also access rules that can be applied to one or more security information management (SIEM) operations performed by the threat intelligence system 102.

Using the rules, the threat intelligence system 102 can analyze the network logs (block F, 818). Analyzing the network logs can include comparing a currently selected log event to a complete set of active rules and looking for logical matches between the two. Analyzing the network logs can include determining whether any of the rules are triggered by activity in the logs. Triggered rules can be identified by the threat intelligence system 102. Notification of such triggers can be transmitted to the alerting sub-system 802 (block G, 820).

The alerting sub-system 802 can differentiate between actual alerts and synthetic alerts (block H, 822). For example, upon receiving the identification of triggered rules, the sub-system 802 can look at the events in the network logs that triggered rules to see whether the events have synthetic tags. If the events have synthetic tags, then such events are synthetic events that were generated and injected by the synthetics handler sub-system 804 for testing the system alerting pipeline. If the events do not have synthetic tags, then the alerting sub-system 804 can determine that the event is an actual event/alert, such as a real security threat.

If the alerting sub-system 802 identifies a synthetic event (block H, 822), the sub-system 802 can transmit to the synthetics handler sub-system 804 a notification that the rule(s) were triggered in the synthetic event(s) (block I, 824). The transmitted notification can include rule identification information. The synthetics handler sub-system 804 can use the transmitted information to validate operations of the threat intelligence system 102 and/or the triggered rule(s) based on the synthetic event(s) performance (block J, 826). For example, the sub-system 804 can determine whether the synthetic event(s) was supposed to trigger a rule, whether the synthetic event(s) triggered the correct rule, and/or whether the triggered rule functioned/performed properly in response to being triggered by the synthetic event. In some implementations, the sub-system 804 can also generate a report about rule and overall system performance, which can be presented to one or more users at the network devices 806A-N and/or other devices. For example, the report can be provided to a user who generated the synthetic event that triggered a rule. The user can then review and/or modify the triggered rule based on the information provided in the report.

In some implementations, as depicted, the alerting sub-system 802 can also transmit an actual alert (block K, 828) when the sub-system 802 determines that an actual alert had triggered a rule (block H, 822). The threat intelligence system 102 and/or another SIEM computing system can then address the actual alert accordingly.

The alerting sub-system 802 can transmit rule and/or system performance information to the threat intelligence system 102 in block L (830). Sometimes, once the synthetic handler sub-system 804 validates the system 102 and/or the rules based on the synthetic network event performance in block J (826), the sub-system 804 can transmit the performance information to threat intelligence system 102 in block L (830).

The threat intelligence system 102 can generate and/or identify informational gaps and/or rule improvement results based on the performance information in block M (832). The system 102 may determine a prioritization scheme for filling in the informational gaps and/or updating the rules based on the performance information. For example, if a particular rule was not triggered or performed as expected (according to analysis by the synthetic handler sub-system 804 in block J, 826), then the system 102 may prioritize the particular rule over one or more other tested rules. Refer to at least the process 400 in FIGS. 4A, 4B, and 4C.

Any one or more of the blocks A-M (810-832) can be repeated and/or part of a continuous feedback loop. Any one or more of the blocks A-M (810-832) can be performed at predefined time intervals (e.g., every 12 hours). For example, the same generated synthetic events can be injected into the network logs every 12 hours. As another example, different synthetic events can be generated and injected into the network logs every 12 hours. A combination of both previously used and new synthetic events can be injected into the network logs every 12 hours. Continuous injection of synthetic events into the network logs can be advantageous as an ongoing check of how the threat intelligence system 102 responds to real-time, dynamic changes in network activity. In some implementations, any one or more of the blocks A-M (810-832) can also be performed at different time intervals, for example, based on user preference in testing the threat intelligence system 102, the alerting sub-system 802, the synthetic handler sub-system 804, and/or the overall alerting pipeline of the threat intelligence system 102.

Figure 9:
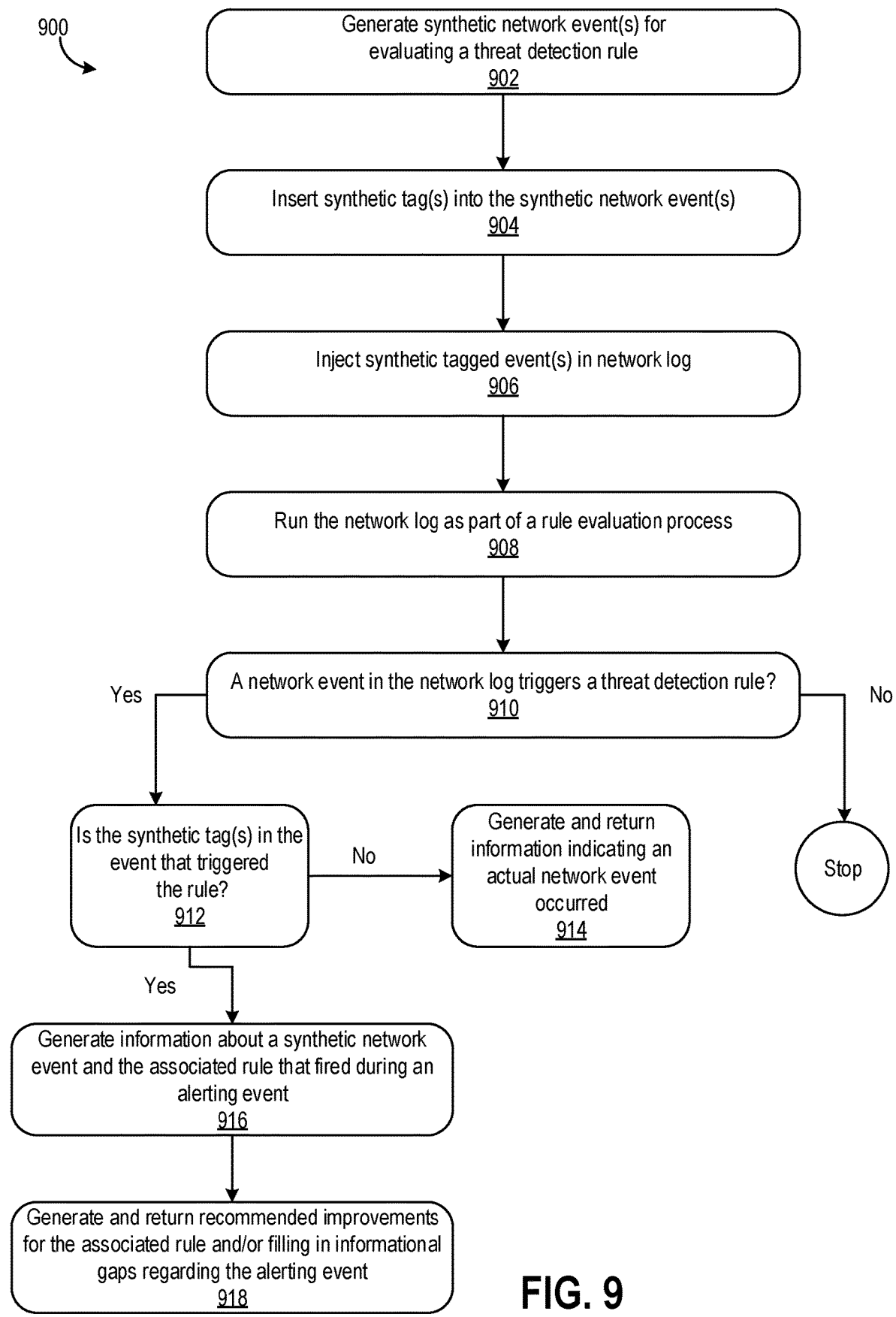
FIG. 9 is a flowchart of a process for evaluating threat detection rules using synthetic network events.

FIG. 9 is a flowchart of a process 900 for evaluating threat detection rules using synthetic network events, similar to the synthetic network events described in reference to FIG. 8. The process 900 can be performed to identify if rules exist and/or how well the rule performs against threats the rule is intended to respond to. The process 900 can take into consideration a volume of rule filings and/or deviations in rule execution as part of evaluating the rules.

The process 900 can be performed by the threat intelligence system 102. The process 900 can also be performed by any of the other computing systems described herein. For illustrative purposes, the process 900 is described from the perspective of a computer system.

Referring to the process 900 in FIG. 9, the computer system can generate at least one synthetic network event for evaluating a threat detection rule in block 902. The synthetic event can be a non-malicious version of an actual security event, which can be used to test a rule that was designed to address the actual security event. Generating the synthetic event can include identifying a first of detection rules of the computer system to test, receiving, from a data store, a synthetic event template that resembles an actual security threat that triggers the first of the detection rules, and generating the synthetic event using the synthetic event template. As part of generating the synthetic event, the computer system can inject a timestamp into the synthetic event. The timestamp can be based on formatting requirements of at least one of the actual security threat and the first of the detection rules.

In block 904, the computer system may insert at least one synthetic tag(s) into the synthetic network event(s). The synthetic tag can indicate that the synthetic event is not the actual security threat. The synthetic event can be tagged such that it triggers the computer system to execute the rules without causing relevant users to respond to the synthetic event as if it is a real threat event.

The computer system can inject the synthetic tagged event(s) in a network log (block 906). The synthetic tagged event(s) can be injected at predetermined time intervals, continuously or at time periods that are indicated or otherwise provided by a relevant user (e.g., security analyst). Refer to the system 800 in FIG. 8 for further discussion about blocks 902, 904, and 906.

In block 908, the computer system can run the network log as part of a rule evaluation process. Events, such as actual and synthetic events, can be executed in an order in which they are presented in the logs. The computer system may also run the network log as part of a normal course of operations during runtime.

The computer system may determine whether a network event in the network log triggers a threat detection rule in block 910. For example, the computer system can match the event with one of the detection rules that is triggered by execution of the event. The computer system can also tag the event with an identifier that is associated with the one of the detection rules that was triggered.

If the network event does not trigger the threat detection rule, the computer system may stop the process 900. This may indicate that an actual event was not identified. This may indicate that a synthetic event was injected into the network log but not intended to trigger a rule.

If the network event does trigger the threat detection rule, the computer system may proceed to block 912, in which the computer system determines if the synthetic tag(s) is in the event that triggered the rule. If the synthetic tag(s) is not in the event that triggered the rule, the computer system can generate and return information indicating an actual network event occurred (block 914). This information can then be returned to an alerting system or other component of the computer system for appropriate action to be taken (e.g., responding to the actual network event).

If the synthetic tag(s) is in the event that triggered the rule, the computer system can generate information about a synthetic network event and the associated rule that fired during an alerting event (block 916). The information can indicate whether the correct rule was fired, whether the rule is up-to-date to address the synthetic network event, how well the rule performed, etc. The computer system may then generate and return recommended improvements for the associated rule and/or recommendation for filling in informational gaps regarding the alerting event (block 918). Refer to the process 400 in FIGS. 4A, 4B, and 4C for further discussion.

Figure 10A:
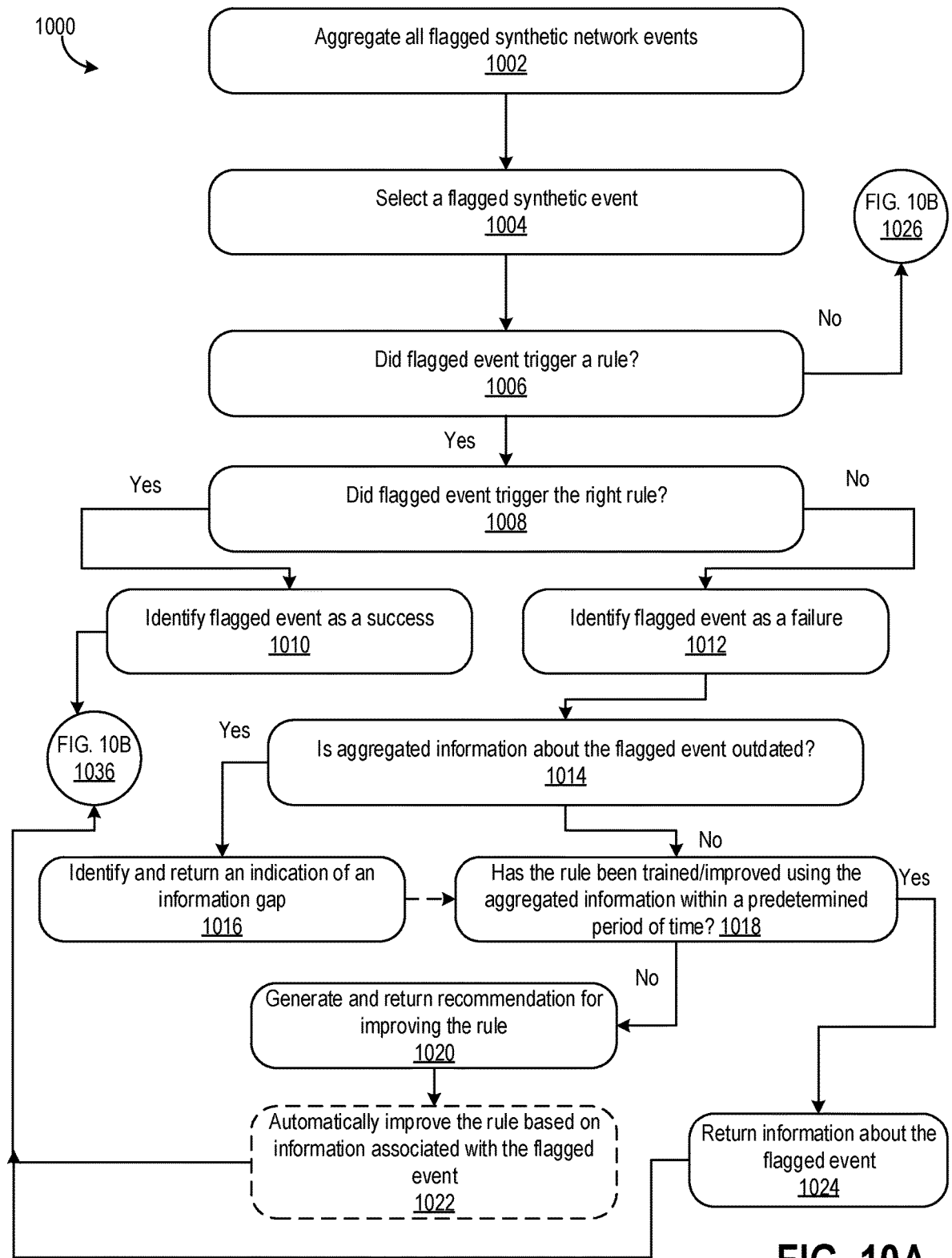
FIGS. 10A and 10B are a flowchart of a process for evaluating and improving an enterprise's threat intelligence system using synthetic network events.
Figure 10B:
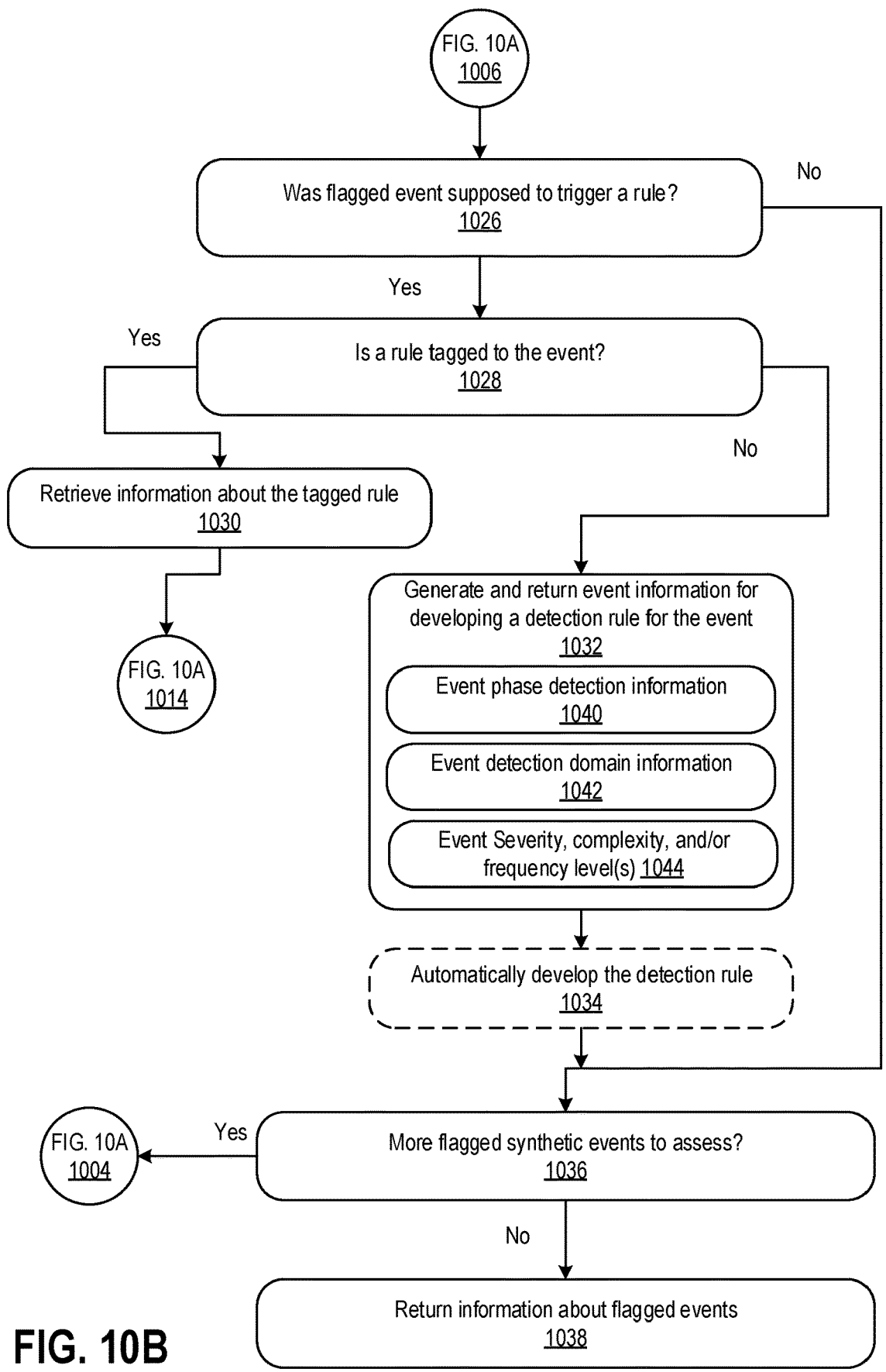

FIGS. 10A and 10B are a flowchart of a process 1000 for evaluating and improving an enterprise's threat intelligence system using synthetic network events, similarly as described in reference to FIGS. 8 and 9. The process 1000 can be performed by the threat intelligence system 102 or any other computing system described herein. For illustrative purposes, the process 1000 is described from the perspective of a computer system.

Referring to the process 1000 in FIGS. 10A and 10B, the computer system can aggregate all flagged synthetic network events (block 1002). Synthetic events can be flagged for purposes of testing/evaluating particular threat detection rules of the computer system. In some implementations, the flagged synthetic network events can include all synthetic network events that are tagged with/to one or more threat detection rules of the computer system. As a result, the computer system can test or otherwise evaluate performance and effectiveness of the one or more threat detection rules.

The computer system can select a flagged synthetic event in block 1004. The computer system can select an event at random. The computer system can select an event having the most outdated information and/or rule. The computer system can select an event having a rule that has not been updated in at least a threshold amount of time. The computer system can select an event that has been prioritized above other events in a prioritization scheme described throughout this disclosure. The computer system can select an event of interest to a relevant users, such as a stakeholder, which may be identified via user input from the user's computing device.

In block 1006, the computer system may determine whether the flagged event triggered a rule. Refer to FIGS. 8 and 9 for further discussion about determining whether the rule was triggered. If the flagged event did not trigger a rule, the computer system can perform block 1026, described further below.

If the flagged event triggered a rule in block 1006, the computer system can determine whether the flagged event triggered the right rule (block 1008). A synthetic tag in the flagged event can be identified and compared to an identifier for the rule that was triggered by the flagged event. If the synthetic tag and the rule identifier match, then it can be determined that the flagged event triggered the right rule. If the synthetic tag and the rule identifier do not match (or, more generally speaking, the flagged event did not trigger the right rule), then the flagged event can be identified as a failure in 1012. If the flagged event is identified as a failure, then the rules need to be analyzed since the appropriate rule was not triggered by the synthetic event. If, on the other hand, the flagged event triggered the right rule, then the flagged event can be identified as a success in 1010. If the flagged event is identified as a success, then the rules may not need to be analyzed since the appropriate rule was triggered by the synthetic event.

Accordingly, if the right rule was triggered by the flagged event, the computer system can identify the flagged event as a success (block 1010) and then perform block 1036, described below. On the other hand, if the right rule was not triggered, the computer system can identify the flagged event as a failure (block 1012).

After identifying the flagged event as a failure in block 1012, the computer system can determine whether aggregated information (e.g., intelligence package) about the flagged event is outdated (block 1014). The computer system can compare a variety of dates that may be associated with actual security events that correspond to the flagged synthetic events. For example, the computer system can determine, based on the aggregated information, when last the rule was triggered, when last the rule was updated, when last a similar flagged event was identified by the computer system, etc. The computer system may determine when last additional information/intel was added to the aggregated information for the actual security event corresponding to the flagged synthetic event. Any of the above-mentioned dates can be compared to predetermined threshold periods of time, which can vary based on the nature of a particular threat (e.g., the more dangerous or risky the threat, the shorter the period of time, and thus the more frequently the rules may be updated; the more that the threat morphs/changes, the shorter the period of time), a frequency of the particular threat occurring/being identified (e.g., the more often the threat is identified, the shorter the period of time, and thus the more frequently the rules may be updated), etc. If, as another example, the information was added within some threshold predetermined amount of time, the computer system may determine that that the aggregated information is up to date. However, if the rule had not been subsequently tested/trained based on the newly added information, then the computer system may nevertheless determine that the rule should be improved.

If the aggregated information is outdated, the computer system can identify and return an indication of an information gap in block 1016. The computer system can generate a notification that the information gap exists. The notification can be added to a list of tasks and/or prioritization scheme, as described herein. Sometimes, the notification can be given a prioritization ranking/score, as similarly described herein. The prioritization ranking/score can be used by the computer system to determine where to order the notification in the list of rankings (e.g., the older the aggregated information, the higher the prioritization ranking; the older the aggregated information and the more frequent the particular flagged event, the higher the prioritization ranking). The notification can be presented at user devices of relevant users (e.g., security analysts) for review. The relevant users may provide user input to add information about the particular threat to the aggregated information about the flagged event.

After performing block 1016, the computer system may either stop the process 1000 or perform block 1018, described below.

In block 1014, if the aggregated information is not outdated (e.g., the information was collected/aggregated within a threshold period of time), the computer system can determine whether the rule has been trained/improved using the aggregated information within a predetermined period of time in block 1018. In other words, the computer system may determine whether the rule has been or is being trained according to the aggregated information for the particular flagged event. The predetermined period of time may be relevant to the last time that the information was aggregated/updated, the last time the rule was trained/improved tested, etc. The computer system may additionally or alternatively determine whether the rule has been trained/improved/tested with information that is or may be associated with other events/threats (meaning the rule has not been properly trained/improved/tested to respond to the particular flagged event).

If the rule has been trained/improved using the aggregated information within the predetermined period of time, the computer system can return information about the flagged event in block 1024. The computer system may then perform block 1036, described below. Returning the information about the flagged event can include generating graphical elements and/or visual displays for presentation at the relevant users' computing devices. The returned information can include an intel package having all or at least a portion of the aggregated information about the flagged event. The returned information can include reports and other data documenting performance of the associated rule, improvements made to the rule, etc.

In block 1018, if the rule has not been trained/improved using the aggregated information within the predetermined period of time, the computer system can generate a recommendation for improving the rule in block 1020. Generating the recommendation can include generating a task to improve the rule, which can then be prioritized into a prioritization scheme with other tasks, as described herein. The recommendation can be provided to the relevant users' computing devices.

The computer system can optionally automatically improve the rule based on the information associated with the flagged event in block 1022. The computer system may then proceed to block 1036. Sometimes, based on a priority of testing the rule, the computer system may automatically improve the rule. If the rule has not been updated in over a predetermined period of time and/or the corresponding flagged event/threat is increasing a number of attacks, the computer system may determine that the rule is of high priority and thus automatically improve the rule. As another example, the computer system may receive user input from one or more of the relevant users' computing devices indicating a desire for the computer system to automatically improve the rule using the information associated with the flagged event. The computer system may then execute instructions, based on receiving the user input, to automatically improve the rule.

After generating the recommendation for improving the rule (block 1020), optionally automatically improving the rule (block 1022), and/or returning information about the flagged event (block 1024), the computer system performs block 1036, in which the computer system can determine whether more flagged synthetic events should be assessed. If there are more flagged events to assess, the computer system proceeds to block 1004 and repeats the blocks described herein for each of the remaining flagged events (or a portion of the remaining flagged events, which may depend on a frequency, complexity, and/or severity of the flagged events). If no more flagged events are to be assessed, the computer system can return information about the flagged events (block 1038). The computer system can return any of the information about the flagged events described above. In some implementations, the computer system may simply stop the process 1000, especially if information about the flagged events was already returned in one or more of the blocks 1016, 1020, and 1024.

Referring back to block 1006, if the flagged event did not trigger a rule, then the computer system performs block 1026, in which the computer system determines whether the flagged event was supposed to trigger a rule. In this block, the computer system may determine whether the flagged event corresponds to any other events that have been detected previously and/or whether the flagged event is associated with a particular known threat actor to the enterprise. If the flagged event does not correspond to any known event and/or threat actor, the computer system may determine that that flagged event is a new security event and thus should be triggering a rule that identifies, addresses, and/or blocks the event. Sometimes, the computer system may determine whether the flagged event corresponds to or otherwise is tagged as a non-malicious activity/actor, in which case the flagged event was not supposed to trigger a rule.

If the flagged event was not supposed to trigger a rule, the computer system can proceed to block 1036 described above. As mentioned herein, the flagged event may not be intended to trigger a rule if the event corresponds to non-malicious activity.

If the flagged event was supposed to trigger a rule in block 1026, the computer system can determine whether a rule is tagged to the event in block 1028. As mentioned herein, the flagged event may not be associated with a known activity/actor, and thus may be a new threat to the enterprise that should trigger a detection/response rule. The flagged event may be associated with a known activity/actor but nevertheless might not have triggered an associated rule. Moreover, determining whether the rule is tagged to the event in block 1028 can include analyzing/processing metadata associated with the rule and/or the event to determine whether a unique identifier links the rule and the event (e.g., one or more tags).

If the rule is tagged to the event, the computer system can retrieve information about the tagged rule in block 1030, and then proceed to perform block 1014 described above (e.g., determining whether there is sufficient up-to-date information for purposes of training/updating the rule).

On the other hand, if no rule is tagged to the event in block 1028, the computer system can generate and return event information for developing a detection rule for the event in block 1032. The event information can be assigned a prioritization ranking/score described herein. The event information can include a task, which can be presented at the relevant users' computing devices. The event information can include any associated/aggregated data that corresponds to the event.

As an example of generating and returning the event information, the computer system can generate and return event phase detection information (block 1040). Refer to at least FIGS. 1B and 2 for further discussion about the phases of attack. The computer system can additionally or alternatively generate and return event detection domain information (block 1042). Refer to at least FIGS. 1B and 2 for further discussion. The computer system can generate and return severity, complexity, and/or frequency level(s) for the flagged event (block 1044). Refer to at least FIGS. 2 and 4A, 4B, and 4C for further discussion.

Optionally, the computer system may automatically develop the detection rule logic for detection creation (block 1034), such as by using AI techniques and/or machine learning (ML) models. For example, given forensics artifacts contained in different formats of the ingested information (e.g., indicators of compromise, file hashes, sandbox reports, network packet capture), security analysts, other relevant users, and/or the computer system described herein can identify which detection rules that are currently in production may apply to a particular scenario. The use of ML/AI techniques can be applied to further grade coverage of the ingested information and, more specifically, the forensics artifacts. Gaps where rules (e.g., signatures such as YARA and/or SURICATA) match the forensics artifacts but currently aren't used in detection rules may be suggested for use in a new detection rule candidate that can be generated, improved, and/or promoted to production. The ML/AI techniques can also be applied to indicate when a previously-existing rule matches newly ingested information (e.g., intelligence), and subsequently should be updated with tagging to link a new actor or malware of the newly ingested information with the previously-existing detection rule. Upon firing of the previously-existing detection rule, more current attributions can be made. The ML/AI techniques can also be used to identify when information/intelligence can be created that, based on attributes, relates strongly (where a relationship can be scored on a scale ranging from 0 to 100%) to one or more detection rules. Based on that analysis, the computer system can generate suggestions indicating that the one or more detection rules can be broadened to encompass the information/intelligence that it relates to. The computer system can also generate suggestions indicating that logic of the one or more detection rules can be updated with the new information/intelligence.

The computer system may then proceed to block 1036 described above. The process 1000 may be iterated through until the computer system determines that there are no more flagged synthetic events to assess.

Figure 11:
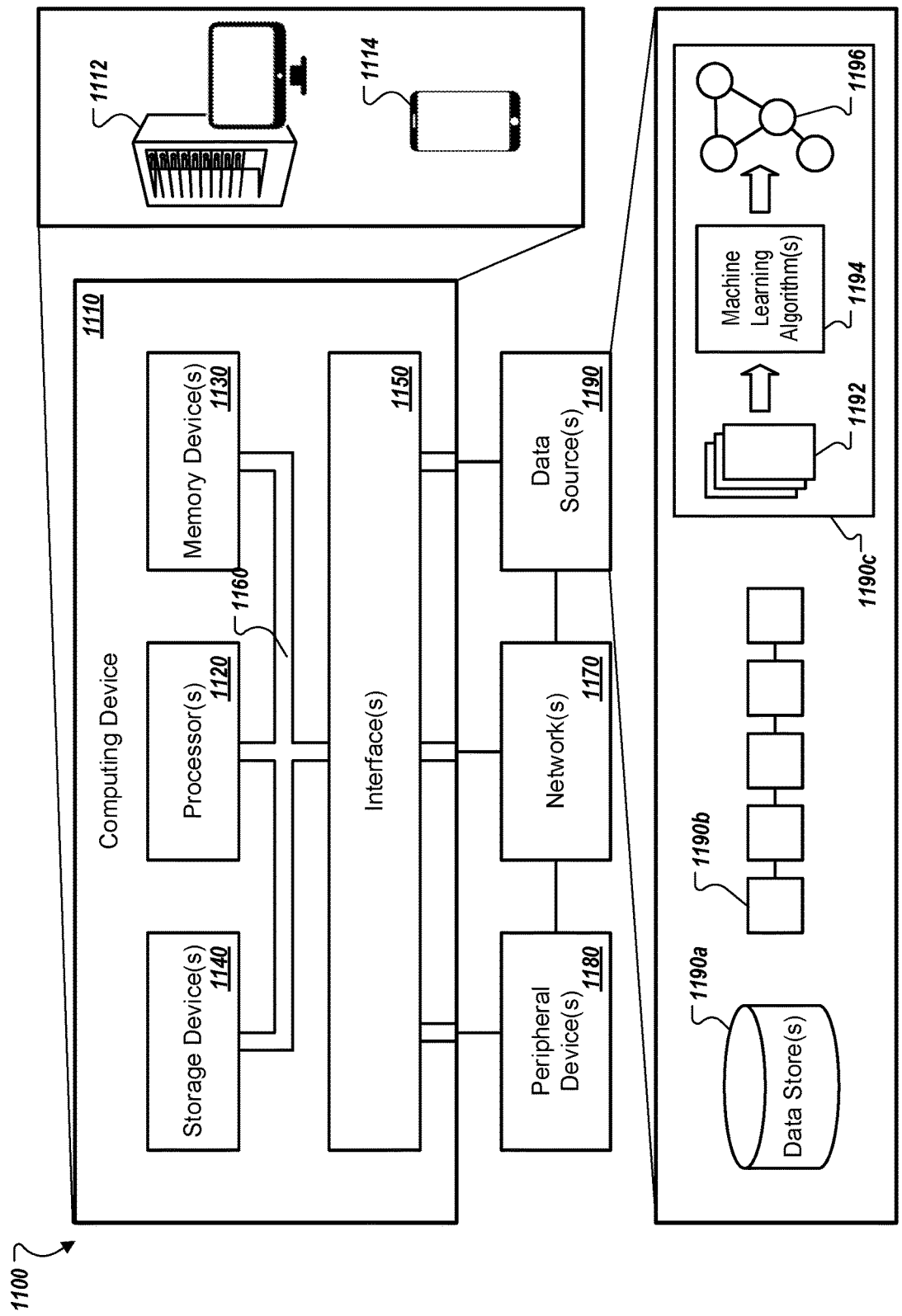
FIG. 11 is a schematic diagram that shows an example of a computing device and a mobile computing device.

FIG. 11 is a schematic diagram that shows an example of a computing system 1100 that can be used to implement the techniques described herein. The computing system 1100 includes one or more computing devices (e.g., computing device 1110), which can be in wired and/or wireless communication with various peripheral device(s) 1180, data source(s) 1190, and/or other computing devices (e.g., over network(s) 1170). The computing device 1110 can represent various forms of stationary computers 1112 (e.g., workstations, kiosks, servers, mainframes, edge computing devices, quantum computers, etc.) and mobile computers 1114 (e.g., laptops, tablets, mobile phones, personal digital assistants, wearable devices, etc.). In some implementations, the computing device 1110 can be included in (and/or in communication with) various other sorts of devices, such as data collection devices (e.g., devices that are configured to collect data from a physical environment, such as microphones, cameras, scanners, sensors, etc.), robotic devices (e.g., devices that are configured to physically interact with objects in a physical environment, such as manufacturing devices, maintenance devices, object handling devices, etc.), vehicles (e.g., devices that are configured to move throughout a physical environment, such as automated guided vehicles, manually operated vehicles, etc.), or other such devices. Each of the devices (e.g., stationary computers, mobile computers, and/or other devices) can include components of the computing device 1110, and an entire system can be made up of multiple devices communicating with each other. For example, the computing device 1110 can be part of a computing system that includes a network of computing devices, such as a cloud-based computing system, a computing system in an enterprise network, or a computing system in another sort of shared network. Processors of the computing device (1110) and other computing devices of a computing system can be optimized for different types of operations, secure computing tasks, etc. The components shown herein, and their functions, are meant to be examples, and are not meant to limit implementations of the technology described and/or claimed in this document.

The computing device 1110 includes processor(s) 1120, memory device(s) 1130, storage device(s) 1140, and interface(s) 1150. Each of the processor(s) 1120, the memory device(s) 1130, the storage device(s) 1140, and the interface(s) 1150 are interconnected using a system bus 1160. The processor(s) 1120 are capable of processing instructions for execution within the computing device 1110, and can include one or more single-threaded and/or multi-threaded processors. The processor(s) 1120 are capable of processing instructions stored in the memory device(s) 1130 and/or on the storage device(s) 1140. The memory device(s) 1130 can store data within the computing device 1110, and can include one or more computer-readable media, volatile memory units, and/or non-volatile memory units. The storage device(s) 1140 can provide mass storage for the computing device 1110, can include various computer-readable media (e.g., a floppy disk device, a hard disk device, a tape device, an optical disk device, a flash memory or other similar solid state memory device, or an array of devices, including devices in a storage area network or other configurations), and can provide date security/encryption capabilities.

The interface(s) 1150 can include various communications interfaces (e.g., USB, Near-Field Communication (NFC), Bluetooth, WiFi, Ethernet, wireless Ethernet, etc.) that can be coupled to the network(s) 1170, peripheral device(s) 1180, and/or data source(s) 1190 (e.g., through a communications port, a network adapter, etc.). Communication can be provided under various modes or protocols for wired and/or wireless communication. Such communication can occur, for example, through a transceiver using a radio-frequency. As another example, communication can occur using light (e.g., laser, infrared, etc.) to transmit data. As another example, short-range communication can occur, such as using Bluetooth, WiFi, or other such transceiver. In addition, a GPS (Global Positioning System) receiver module can provide location-related wireless data, which can be used as appropriate by device applications. The interface(s) 1150 can include a control interface that receives commands from an input device (e.g., operated by a user) and converts the commands for submission to the processors 1120. The interface(s) 1150 can include a display interface that includes circuitry for driving a display to present visual information to a user. The interface(s) 1150 can include an audio codec which can receive sound signals (e.g., spoken information from a user) and convert it to usable digital data. The audio codec can likewise generate audible sound, such as through an audio speaker. Such sound can include real-time voice communications, recorded sound (e.g., voice messages, music files, etc.), and/or sound generated by device applications.

The network(s) 1170 can include one or more wired and/or wireless communications networks, including various public and/or private networks. Examples of communication networks include a LAN (local area network), a WAN (wide area network), and/or the Internet. The communication networks can include a group of nodes (e.g., computing devices) that are configured to exchange data (e.g., analog messages, digital messages, etc.), through telecommunications links. The telecommunications links can use various techniques (e.g., circuit switching, message switching, packet switching, etc.) to send the data and other signals from an originating node to a destination node. In some implementations, the computing device 1110 can communicate with the peripheral device(s) 1180, the data source(s) 1190, and/or other computing devices over the network(s) 1170. In some implementations, the computing device 1110 can directly communicate with the peripheral device(s) 1180, the data source(s), and/or other computing devices.

The peripheral device(s) 1180 can provide input/output operations for the computing device 1110. Input devices (e.g., keyboards, pointing devices, touchscreens, microphones, cameras, scanners, sensors, etc.) can provide input to the computing device 1110 (e.g., user input and/or other input from a physical environment). Output devices (e.g., display units such as display screens or projection devices for displaying graphical user interfaces (GUIs)), audio speakers for generating sound, tactile feedback devices, printers, motors, hardware control devices, etc.) can provide output from the computing device 1110 (e.g., user-directed output and/or other output that results in actions being performed in a physical environment). Other kinds of devices can be used to provide for interactions between users and devices. For example, input from a user can be received in any form, including visual, auditory, or tactile input, and feedback provided to the user can be any form of sensory feedback (e.g., visual feedback, auditory feedback, or tactile feedback).

The data source(s) 1190 can provide data for use by the computing device 1110, and/or can maintain data that has been generated by the computing device 1110 and/or other devices (e.g., data collected from sensor devices, data aggregated from various different data repositories, etc.). In some implementations, one or more data sources can be hosted by the computing device 1110 (e.g., using the storage device(s) 1140). In some implementations, one or more data sources can be hosted by a different computing device. Data can be provided by the data source(s) 1190 in response to a request for data from the computing device 1110 and/or can be provided without such a request. For example, a pull technology can be used in which the provision of data is driven by device requests, and/or a push technology can be used in which the provision of data occurs as the data becomes available (e.g., real-time data streaming and/or notifications). Various sorts of data sources can be used to implement the techniques described herein, alone or in combination.

In some implementations, a data source can include one or more data store(s) 1190*a*. The database(s) can be provided by a single computing device or network (e.g., on a file system of a server device) or provided by multiple distributed computing devices or networks (e.g., hosted by a computer cluster, hosted in cloud storage, etc.). In some implementations, a database management system (DBMS) can be included to provide access to data contained in the database(s) (e.g., through the use of a query language and/or application programming interfaces (APIs)). The database(s), for example, can include relational databases, object databases, structured document databases, unstructured document databases, graph databases, and other appropriate types of databases.

In some implementations, a data source can include one or more blockchains 1190*b*. A blockchain can be a distributed ledger that includes blocks of records that are securely linked by cryptographic hashes. Each block of records includes a cryptographic hash of the previous block, and transaction data for transactions that occurred during a time period. The blockchain can be hosted by a peer-to-peer computer network that includes a group of nodes (e.g., computing devices) that collectively implement a consensus algorithm protocol to validate new transaction blocks and to add the validated transaction blocks to the blockchain. By storing data across the peer-to-peer computer network, for example, the blockchain can maintain data quality (e.g., through data replication) and can improve data trust (e.g., by reducing or eliminating central data control).

In some implementations, a data source can include one or more machine learning systems 1190*c*. The machine learning system(s) 1190*c*, for example, can be used to analyze data from various sources (e.g., data provided by the computing device 1110, data from the data store(s) 1190*a*, data from the blockchain(s) 1190*b*, and/or data from other data sources), to identify patterns in the data, and to draw inferences from the data patterns. In general, training data 1192 can be provided to one or more machine learning algorithms 1194, and the machine learning algorithm(s) can generate a machine learning model 1196. Execution of the machine learning algorithm(s) can be performed by the computing device 1110, or another appropriate device. Various machine learning approaches can be used to generate machine learning models, such as supervised learning (e.g., in which a model is generated from training data that includes both the inputs and the desired outputs), unsupervised learning (e.g., in which a model is generated from training data that includes only the inputs), reinforcement learning (e.g., in which the machine learning algorithm(s) interact with a dynamic environment and are provided with feedback during a training process), or another appropriate approach. A variety of different types of machine learning techniques can be employed, including but not limited to convolutional neural networks (CNNs), deep neural networks (DNNs), recurrent neural networks (RNNs), and other types of multi-layer neural networks.

Various implementations of the systems and techniques described herein can be realized in digital electronic circuitry, integrated circuitry, specially designed ASICs (application specific integrated circuits), computer hardware, firmware, software, and/or combinations thereof. A computer program product can be tangibly embodied in an information carrier (e.g., in a machine-readable storage device), for execution by a programmable processor. Various computer operations (e.g., methods described in this document) can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, by a computer to perform a certain activity or bring about a certain result. A computer program can be written in any form of programming language, including compiled or interpreted languages, and can be deployed in any form, including as a stand-alone program or as a module, component, subroutine, or other unit suitable for use in a computing environment. A computer program product can be a computer- or machine-readable medium, such as a storage device or memory device. As used herein, the terms machine-readable medium and computer-readable medium refer to any computer program product, apparatus and/or device (e.g., magnetic discs, optical disks, memory, etc.) used to provide machine instructions and/or data to a programmable processor, including a machine-readable medium that receives machine instructions as a machine-readable signal. The term machine-readable signal refers to any signal used to provide machine instructions and/or data to a programmable processor.

Suitable processors for the execution of a program of instructions include, by way of example, both general and special purpose microprocessors, and can be a single processor or one of multiple processors of any kind of computer. Generally, a processor will receive instructions and data from a read-only memory or a random access memory or both. The elements of a computer are a processor for executing instructions and one or more memory devices for storing instructions and data. Generally, a computer can also include, or can be operatively coupled to communicate with, one or more mass storage devices for storing data files. Such devices can include magnetic disks (e.g., internal hard disks and/or removable disks), magneto-optical disks, and optical disks. Storage devices suitable for tangibly embodying computer program instructions and data can include all forms of non-volatile memory, including by way of example semiconductor memory devices, flash memory devices, magnetic disks (e.g., internal hard disks and removable disks), magneto-optical disks, and optical disks. The processor and the memory can be supplemented by, or incorporated in, ASICs (application-specific integrated circuits).

The systems and techniques described herein can be implemented in a computing system that includes a back end component (e.g., a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). The computer system can include clients and servers, which can be generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A system for identifying threat events in an enterprise network and managing detection rules and responses to the threat events, the system comprising:
    a database configured to store information about threat events known to the enterprise network and threat detection rules;
    an enterprise network comprising a plurality of computing devices communicating with each other and with other computing devices external to the enterprise network using at least one of wired or wireless communications; and
    a threat intelligence computer system configured to monitor detected threat events and manage the threat detection rules and responses to the detected threat events, the computer system being configured to perform operations comprising:
        receiving information about a detected threat event, wherein the information includes at least a phase of attack of the threat event and a detection domain of the threat event;
        applying, based on processing the information about the detected threat event, at least one tag to the detected threat event, wherein the at least one tag associates the detected threat event with at least one of the threat detection rules that was triggered in response to detecting the threat event in the enterprise network;
        evaluating the at least one tagged threat detection rule against the information about the detected threat event;
        flagging the detected threat event as having an improvement opportunity based on the evaluation satisfying one or more improvement opportunity criteria;
        determining, for the detected threat event, whether the at least one threat detection rule tagged to the detected threat event is a candidate for improvement, wherein the determining is based on:
            determining whether at least a threshold period of time passed since a date associated with the detected threat event, and
            based on a determination that at least the threshold period of time passed since the date associated with the detected threat event, determining that the at least one threat detection rule is the candidate for improvement;
        generating, based on a determination that the at least one threat detection rule is the candidate for improvement, instructions for improving the at least one threat detection rule;
        generating a prioritization scheme indicating an order by which to address the instructions to improve the at least one threat detection rule amongst a plurality of instructions to improve one or more threat detection rules;
        generating output including the prioritization scheme; and
        transmitting the output to user devices of relevant users of the enterprise network, wherein transmitting the output to the user devices comprises transmitting instructions that, when executed by the user devices, causes the user devices to present the output in respective graphical user interface (GUI) displays.

2. The system of claim 1, wherein the operations further comprise:
    receiving, from at least one of the user devices and based on the presented output, user input indicating one or more adjustments to the at least one threat detection rule;
    adjusting the at least one threat detection rule based on the user input; and
    transmitting the adjusted threat detection rule to a network security computer system, wherein the network security computer system is configured to execute the adjusted threat detection rule in response to detecting threat events in the enterprise network.

3. The system of claim 1, wherein the operations further comprise:
    receiving, from at least one of the user devices, user input indicating additional information about the at least one threat detection rule or the at least one identified threat event; and
    updating, based on the additional information, one or more data entries in the data store that are associated with the at least one identified threat event.

4. The system of claim 1, wherein the phase of attack comprises at least one of an intrusion phase, a host activity phase, a propagation phase, and an end goal phase, wherein the threat intelligence computer system is configured to automatically detect the phase of attack of the threat event.

5. The system of claim 1, wherein generating a prioritization scheme comprises:
    determining, for the instructions to improve the at least one threat detection rule associated with the detected threat event, a prioritization level, wherein determining the prioritization level is based on identifying a prevalence of one or more tactics, techniques, and procedures indicated in the information about the detected threat event; and
    ranking, in the prioritization scheme, the instructions to improve the at least one threat detection rule associated with the detected threat event amongst the plurality of instructions from highest prevalence to lowest prevalence based on the determined prioritization level.

6. The system of claim 5, wherein identifying the prevalence of one or more tactics, techniques, and procedures indicated in the information about the detected threat event comprises:

determining a high prevalence based on the one or more tactics, techniques, and procedures being identified in at least two-thirds of the threat events known to the enterprise network;

determining a medium prevalence based on the one or more tactics, techniques, and procedures being identified in approximately half but less than two-thirds of the threat events known to the enterprise network; and determining a low prevalence based on the one or more tactics, techniques, and procedures being identified in less than half of the threat events known to the enterprise network.

7. The system of claim 1, wherein the operations further comprise:

determining a prioritization level for improving the at least one threat detection rule based on how much time passed since the date, wherein a higher prioritization level is determined in response to more time passing since the date and a lower prioritization level is determined in response to less time passing since the date;

generating a task to improve the at least one threat detection rule;

ranking the task in the prioritization scheme based on the corresponding prioritization level; and returning the prioritization scheme.

8. The system of claim 1, wherein the date includes a date the information about the detected threat event was last updated with information.

9. The system of claim 1, wherein the date includes a date that the detected threat event was first observed in the enterprise network.

10. The system of claim 1, wherein the date includes a date that the detected threat event was last observed in the enterprise network.

11. The system of claim 1, wherein the operations further comprise determining how a threat actor associated with the detected threat event evolves their attack over time, wherein the determining is based on comparing attack information from a date that the detected threat event was first observed with attack information from a date that the detected threat event was last observed.

12. The system of claim 11, wherein the operations further comprise:

generating a visualization of an attack flow over time for the threat actor based on the comparison; and transmitting instructions to present the visualization to the user devices that, when executed by the user devices, causes the user devices to present the visualization in the respective GUI displays.

13. The system of claim 1, wherein determining, for the detected threat event, whether the at least one threat detection rule tagged to the detected threat event is a candidate for improvement comprises:

determining whether at least a threshold period of time passed since a date that the at least one threat detection rule was tested; and based on a determination that at least the threshold period of time passed since the date that the at least one threat detection rule was tested, generating instructions to re-test and validate the at least one threat detection rule with the information about the detected threat event.

14. The system of claim 1, wherein the information about the detected threat event is received from a network security computer system, the network security computer system being configured to, using the threat detection rules, (i) detect threat events in network traffic of the enterprise network and (ii) respond to the detected threat events.

15. The system of claim 14, wherein:

the enterprise network further comprises a network interface having network sensors, the network sensors of the network interface configured to (i) detect the network traffic that is ingested by the enterprise network and (ii) transmit the network traffic to the network security computer system.

16. The system of claim 1, wherein the information about the detected threat event is received from one or more third party systems configured to monitor network traffic and generate threat information based on detecting one or more threat events in the monitored network traffic.

17. The system of claim 1, wherein the database comprises:

a threat detection rules database configured to maintain the threat detection rules, a threat actor database configured to maintain information about threat actors that are identified in association with threat events at the enterprise network, a malware database configured to maintain information about different types of malware that are detected in the threat events at the enterprise network, and an associations database configured to maintain tagging information that associates the threat events, the threat actors, and the malware with the threat detection rules.

18. The system of claim 1, wherein the instructions for improving the at least one threat detection rule comprises instructions to identify additional information about the detected threat event.

19. The system of claim 1, wherein the instructions for improving the at least one threat detection rule comprise threat data gaps, threat data freshness information, and threat detection rule and response performance.

20. The system of claim 15, wherein the network security computer system is configured to (i) detect and respond to the threat events in the network traffic, (ii) transmit information about the detected threat events to the database for storage and use by the threat intelligence computer system, and (iii) transmit benign traffic of the network traffic to one or more recipients.

* * * * *